US012466191B2

(12) United States Patent
Burke et al.

(10) Patent No.: US 12,466,191 B2
(45) Date of Patent: Nov. 11, 2025

(54) PRINTING UNIT WITH TANDEM INKJET MODULES

(71) Applicant: Memjet Technology Limited, Dublin (IE)

(72) Inventors: David Oliver Burke, North Ryde (AU); Mark Profaca, North Ryde (AU); Robert John Brice, North Ryde (AU); Peter Crichton, North Ryde (AU)

(73) Assignee: Memjet Technology Limited, Dublin (IE)

( * ) Notice: Subject to any disclaimer, the term of this patent is extended or adjusted under 35 U.S.C. 154(b) by 179 days.

(21) Appl. No.: 18/309,328

(22) Filed: Apr. 28, 2023

(65) Prior Publication Data

US 2023/0391081 A1 Dec. 7, 2023

Related U.S. Application Data

(60) Provisional application No. 63/476,671, filed on Dec. 22, 2022, provisional application No. 63/377,240, (Continued)

(51) Int. Cl.

| | |
|---|---|
| ***B41J 2/17*** | (2006.01) |
| ***B41J 2/165*** | (2006.01) |
| ***B41J 2/175*** | (2006.01) |
| ***B41J 2/30*** | (2006.01) |
| ***B41J 25/304*** | (2006.01) |
| ***B41J 25/34*** | (2006.01) |

(52) U.S. Cl.
CPC ......... *B41J 2/1752* (2013.01); *B41J 2/16508* (2013.01); *B41J 2/16535* (2013.01); *B41J 25/304* (2013.01); *B41J 25/34* (2013.01)

(58) Field of Classification Search
CPC ........ B41J 2/1433; B41J 2/15; B41J 2/16505; B41J 2/1652; B41J 2/16508; B41J 2/16544; B41J 2/1721; B41J 2/17523; B41J 2/21; B41J 25/34; B41J 25/003; B41J 25/304
See application file for complete search history.

(56) References Cited

U.S. PATENT DOCUMENTS 9,789,714 B1 10/2017 Tunmore
2003/0156155 A1 * 8/2003 Silverbrook ............. B41J 2/145 347/40

(Continued)

FOREIGN PATENT DOCUMENTS

| | | | |
|---|---|---|---|
| DE | 10228984 | A1 | 2/2003 |
| JP | H09295441 | A | 11/1997 |
| WO | WO-2021175469 | A1 | 9/2021 |

*Primary Examiner* — Jason S Uhlenhake
(74) *Attorney, Agent, or Firm* — Garson & Gutierrez, PC

(57) ABSTRACT

A printing unit includes: a unit chassis and a pair of opposed inkjet modules mounted in tandem on the unit chassis in forward and reverse orientations, each inkjet module having one respective printhead and at least one of: a capper and a wiper. Each printhead includes first and second rows of print chips mounted on a unitary surface of a respective ink manifold, the first and second rows of print chips having a plurality of print chips butted end-on-end along a length of the printhead. The printheads are wholly aligned with respect to a media feed direction for printing in four ink colors from the pair of printheads.

13 Claims, 15 Drawing Sheets

Related U.S. Application Data filed on Sep. 27, 2022, provisional application No. 63/348,445, filed on Jun. 2, 2022, provisional application No. 63/348,449, filed on Jun. 2, 2022.

(56) References Cited

U.S. PATENT DOCUMENTS

| | | | | |
|---|---|---|---|---|
| 2006/0087531 | A1* | 4/2006 | Eiseman | B41J 2/155<br>347/43 |
| 2008/0309732 | A1* | 12/2008 | Iwao | B41J 2/155<br>347/65 |
| 2010/0245415 | A1 | 9/2010 | Tsai et al. | |
| 2012/0092403 | A1* | 4/2012 | Profaca | B41J 25/001<br>347/49 |
| 2013/0100209 | A1* | 4/2013 | Lutz | B41J 2/515<br>347/49 |
| 2015/0070426 | A1 | 3/2015 | Nakamura | |
| 2018/0222198 | A1 | 8/2018 | Thelander et al. | |
| 2018/0345697 | A1 | 12/2018 | Profaca et al. | |
| 2019/0070856 | A1* | 3/2019 | Baterna | B41J 2/16505 |

* cited by examiner

PRINTING UNIT WITH TANDEM INKJET MODULES

CROSS-REFERENCE TO RELATED APPLICATIONS

The present application claims the benefit of priority under 35 U.S.C. § 119(e) of U.S. Provisional Application No. 63/348,445, entitled INKJET MODULE WITH PRINTHEAD NEST ASSEMBLY, filed Jun. 2, 2022; U.S. Provisional Application No. 63/348,449, entitled PRINTING UNIT WITH TANDEM INKJET MODULES, filed Jun. 2, 2022; U.S. Provisional Application No. 63/377,240, entitled PRINTING UNIT WITH TANDEM INKJET MODULES, filed Sep. 27, 2022; and U.S. Provisional Application No. 63/476,671, entitled PRINTING UNIT WITH TANDEM INKJET MODULES, filed Dec. 22, 2022, the contents of each of which are hereby incorporated by reference in their entirety for all purposes.

The present application is related to U.S. application Ser. No. 18/308,971 filed on Apr. 28, 2023, entitled INK DELIVERY SYSTEM WITH FILTER PROTECTION, the contents of which is hereby incorporated by reference in its entirety for all purposes.

FIELD OF THE INVENTION

This invention relates to a high-speed printing unit. It has been developed primarily for minimizing a width of a print zone and optimizing print quality in a full-color digital inkjet press having multiple redundancy in each ink color.

BACKGROUND OF THE INVENTION

Inkjet printers employing Memjet® page wide technology are commercially available for a number of different printing applications, including desktop printers, digital inkjet presses and wide format printers. Memjet® printers typically comprise one or more stationary inkjet printheads having a length of at least 200 mm, which are user replaceable. For example, a desktop label printer comprises a single user-replaceable full color, a high-speed inkjet press comprises a plurality of user-replaceable monochrome printheads aligned along a media feed direction, and a wide format printer comprises a plurality of user-replaceable printheads in a staggered overlapping arrangement so as to span across a wide format media feed path.

Analogue printing presses are conventionally used for relatively long print runs where the cost of producing dedicated printing plates is economically feasible. Increasingly, industrial print systems use single-pass digital inkjet printing for relatively shorter print runs. Digital inkjet printing avoids the high set-up costs of producing printing plates and allows each print job to be tailored to a particular customer. Desirably, web feed systems for existing analogue print systems should be adaptable so as to enable ‘drop-in’ inkjet modules in place of, for example, offset printing stations. It is therefore desirable for inkjet modules to occupy minimal space with respect to a media feed direction, whilst allowing full color printing at high speeds with optimum print quality.

Memjet printing technology, which uses rows of print chips butted end-on-end to construct a page wide printhead, is highly suited for reducing the overall span of the print zone along a media feed direction. Each print chip has five rows of nozzles, which may be used for 5× redundant printing in a monochrome printhead.

U.S. Pat. No. 10,857,821 (the contents of which are incorporated herein by reference) describes a printing system having a configurable array of print modules, each print module having a respective monochrome printhead configured for single-pass printing. Four print modules may be arranged along a media path for full-color (CMYK) printing with 5× redundancy in each color plane. While the system described in U.S. Pat. No. 10,857,821 provides OEMs with flexibility in the design of inkjet presses, as well as high-quality and high-speed printing using 5× redundancy, the print modules must be aligned and spaced along the media feed path for full-color printing. This places demands on media feed systems, which are required to align all colors and, consequently, there are relatively high set-up costs for OEMs. Nevertheless, those costs are a still significantly less than alternative page wide printing systems that use overlapping print chips or very large print chips to achieve single-pass printing.

U.S. Pat. No. 10,293,609 (the contents of which are incorporated herein by reference) describes a full color page wide printhead having two rows of butting print chips receiving ink from a common manifold. The printhead has 2× redundancy for each ink color provided by four active nozzle rows in each row of print chips.

It would be desirable to provide a low-cost printing unit having multiple redundancy in each ink color, which minimizes a span of the print zone along the media feed direction for printing in four colors (CMYK). It would be further desirable to provide such a printing unit, which allows access to printhead(s) for replacement, simplifies printhead alignment and set-up procedures, and enables printing with variable printhead-paper-spacing (PPS) whilst optimizing print quality.

SUMMARY OF THE INVENTION

In one aspect, there is provided a printing unit comprising:

- a unit chassis; and
- a pair of opposed inkjet modules mounted in tandem on the unit chassis in forward and reverse orientations, each inkjet module having one respective printhead and, optionally, at least one of: a capper and a wiper, wherein:

- each printhead comprises two rows of print chips mounted on a unitary surface of a respective ink manifold, each row of print chips comprising a plurality of print chips butted end-on-end along a length of the printhead;
- one row of print chips is supplied with only one ink color from its respective manifold; and
- the printheads are wholly aligned with respect to a media feed direction for printing in four ink colors from the pair of printheads.

The printing unit described above advantageously provides a highly compact printing system for printing in full color, with multiple redundancy and a narrow print zone span. The printing unit is therefore well suited for use as a ‘drop-in’ unit in existing media feed systems currently used for analogue printing. In essence, the printing unit functions as a ‘mini inkjet press’ inasmuch as it achieves a similar print quality to existing inkjet presses having a series of monochrome printheads, but with a fraction of the footprint and cost.

As used herein, the term “inkjet module” is taken to mean an assembly of components, which includes an inkjet printhead, such as an elongate printhead configured for single-pass printing (known in the art as a “page wide” or “line head" printhead). The inkjet module typically includes one or more of the following components to provide a fully integrated inkjet system: maintenance components, such as a capper and/or a wiper; mechanisms for moving the printhead and/or maintenance components; ink delivery components, such as pump(s), valve(s), ink connector(s), etc.; and electronic circuitry for supplying power and/or data to the printhead.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids, solar inks, biological fluids, sensing fluids and the like.

As used herein, the term "mounted" includes both direct mounting and indirect mounting via an intervening part.

BRIEF DESCRIPTION OF THE DRAWINGS

Specific embodiments of the present invention will now be described by way of example only with reference to the accompanying drawings, in which.

DETAILED DESCRIPTION OF THE INVENTION

Printing Unit

Figure 1:
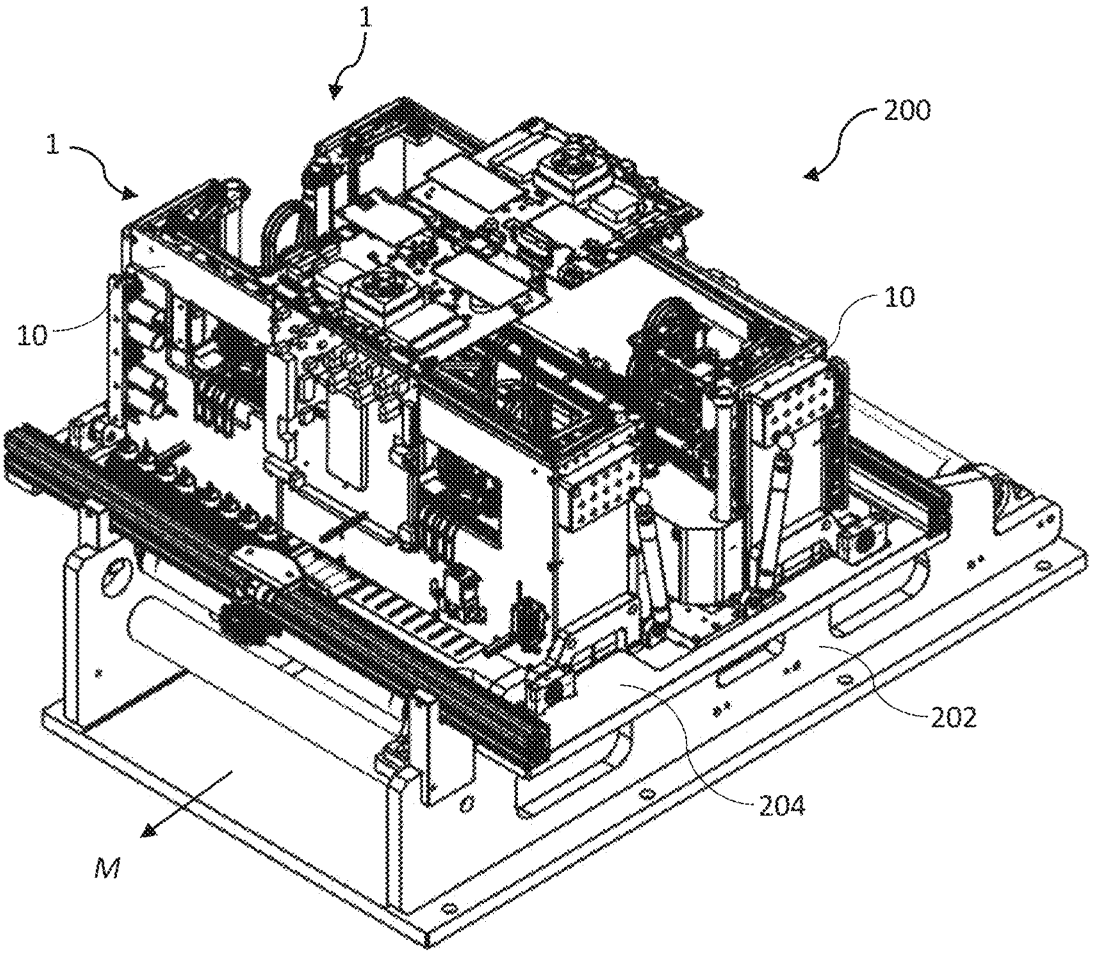
FIG. 1 is a perspective of a printing unit mounted on a support chassis.

Referring to FIG. 1, there is shown a printing unit 200 mounted on a support chassis 202 configured for feeding media past the printing unit along a media feed direction M. The printing unit 200, shown in isolation in FIG. 2, comprises a unit chassis 204 and a pair of opposed upstream and downstream inkjet modules 1A and 1B mounted in tandem on the unit chassis in forward and reverse orientations. An individual inkjet module 1 is described below and is also described in detail in Applicant's U.S. Provisional Application No. 63/348,445, entitled INKJET MODULE WITH PRINTHEAD NEST ASSEMBLY, filed Jun. 2, 2022, the contents of which are incorporated herein by reference.

Each inkjet module 1 comprises a module chassis 10 pivotally mounted on chassis side bars 205 of the unit chassis 204 about a respective pair of module pivots 206 positioned at opposite sides of the module chassis. Accordingly, each inkjet module 1 is pivotable about a pivot axis perpendicular to the media feed direction M. The upstream and downstream inkjet modules 1A and 1B of the printing unit 200 are pivotally movable towards and away from each other, such that the printing unit may be configurable in a clamshell-closed configuration for printing (FIGS. 1 and 2) and a clamshell-open configuration (FIGS. 4 and 5) for printhead replacement and/or maintenance. Each module chassis 10 has an open respective front face, which facilitates access to internal components of each individual inkjet module 1 in the clamshell-open configuration by virtue of the opposed relationship of the inkjet modules in the printing unit (i.e. one inkjet module is rotated by 180 degrees relative to the other inkjet module). Gas struts 208 interconnect each module chassis 10 and the chassis side bars 205 to provide a dampened over center pivoting mechanism for each inkjet module 1.

In the embodiment shown in FIGS. 1 to 5, the upstream and downstream inkjet modules 1A and 1B are independently pivotable so that one or both of the inkjet modules may be pivoted. However, the skilled person will appreciate that other pivoting mechanisms may be employed, whereby the pair of module chassis 10 are mechanically linked such that the inkjet modules necessarily pivot into the clamshell-open positioned. These and other pivoting mechanisms will be readily apparent to the person skilled in art.

Each individual inkjet module 1 is a fully integrated unit comprising a respective printhead 3, as well as a capper and a wiper for maintaining the printhead. Each printhead 3 is of the type described in U.S. Pat. No. 10,293,609 (the contents of which are incorporated herein by reference) and comprises two rows of print chips 5 mounted on a unitary surface of a respective ink manifold. Each row of print chips 5 comprises a plurality of print chips butted end-on-end along a length of its respective printhead 3. Each inkjet module 1 prints two colors of ink from two rows of print chips 5 of its respective printhead 3 and, furthermore, printheads 3 of the pair of inkjet modules 1 mounted in tandem on the unit chassis 204 are wholly aligned with respect to a media feed direction M, such that the printing unit 200 is configured for redundant full color printing of four ink colors (CMYK). Redundancy in each color channel is provided by multiple aligned nozzle rows (e.g., 3, 4 or 5 nozzle rows) in each printhead 3 that are wholly aligned along the media feed direction M and print the same-colored ink. Each set of aligned nozzles is, therefore, capable of printing onto a same pixel position during single pass printing from the stationary printheads 3 to provide redundancy in each color.

Figure 2:
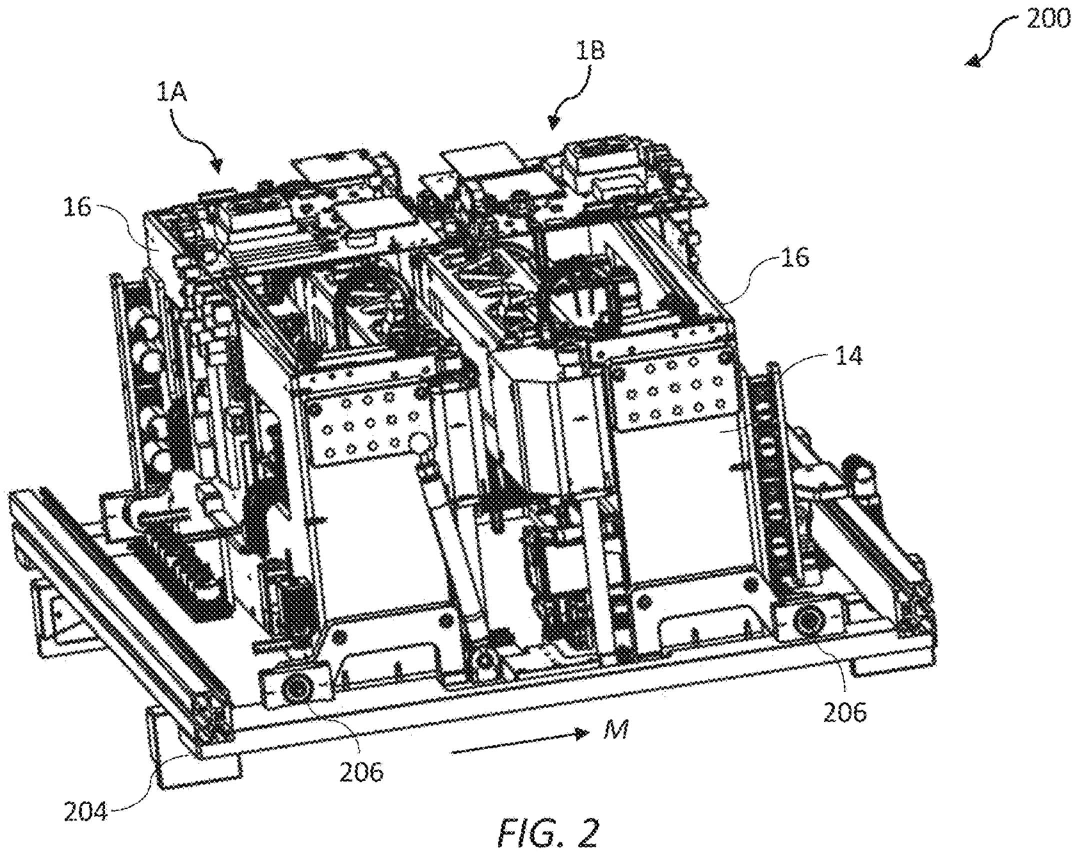
FIG. 2 is a perspective of the printing unit in isolation.

The module chassis 10 of each inkjet module 1 has an elongate base plate 12 with a rear wall 14 and a pair of opposite end walls 16 extending upwards from the base plate. Each base plate is C-shaped having a pair of transverse arms 18 extending parallel to the media feed direction from opposite ends of a longitudinal base member 20 extending perpendicular to the media feed direction. Each base plate 12, therefore, defines an open longitudinal slot 22 for receiving a respective printhead 3. In FIG. 2, the printheads 3 are raised above the base plate 12 for capping and/or wiping, and in FIG. 6 the printheads are lowered through the slots 22 for printing.

The opposed upstream and downstream inkjet modules 1A and 1B in respective forward and reverse orientations in the printing unit 200 have opposed C-shaped base plates 12, such that the pair of open longitudinal slots 22 are proximally positioned relative to the pair of longitudinal base members 20. Accordingly, the printheads 3, which are received through their respective slots 22, are disposed relatively proximally, thereby minimizing the total span of the print zone (indicated by double-headed arrow Z in FIG. 3) along the media feed direction M. For example, the print zone Z containing both printheads 3 may span less than 20 cm, less than 150 cm or less than 125 cm in the printing unit 200.

Figure 3:
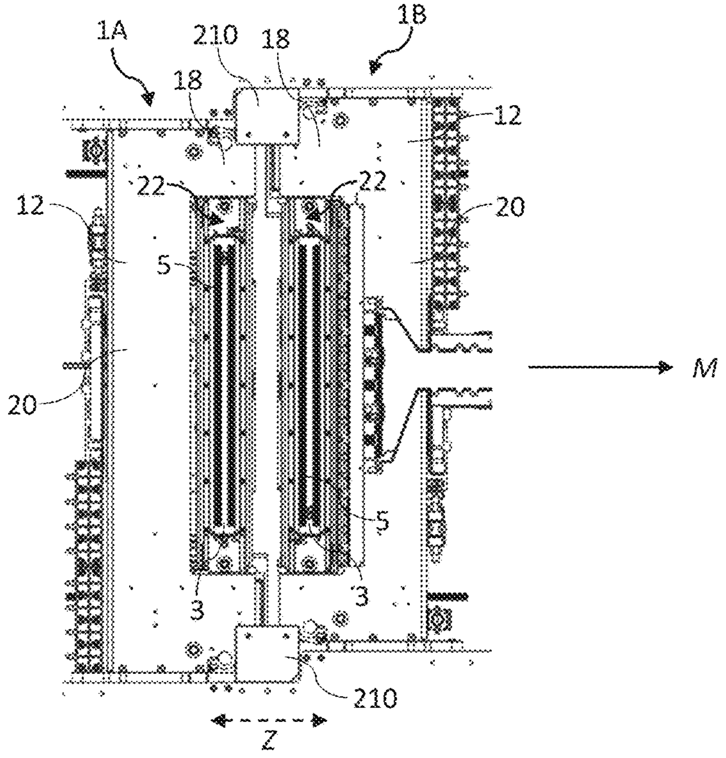
FIG. 3 is a bottom of the part of the printing unit.
Figure 4:
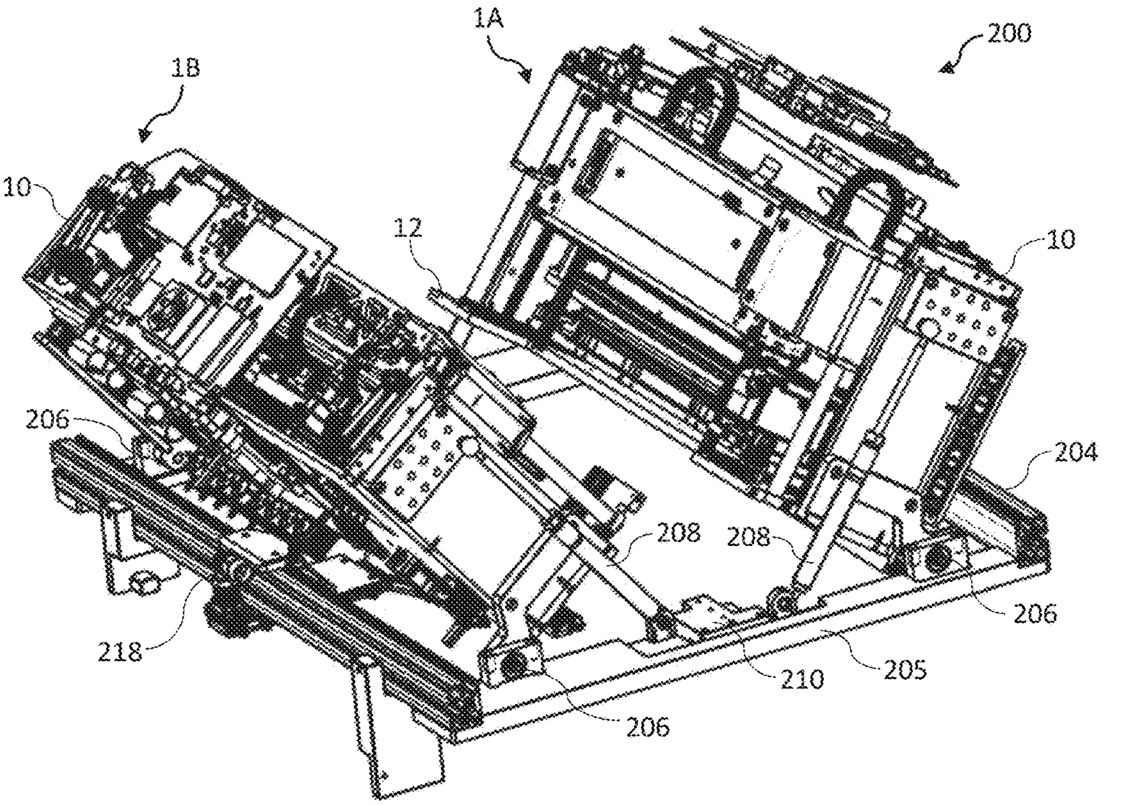
FIG. 4 is a perspective of the printing unit in a clamshell-open position.
Figure 5:
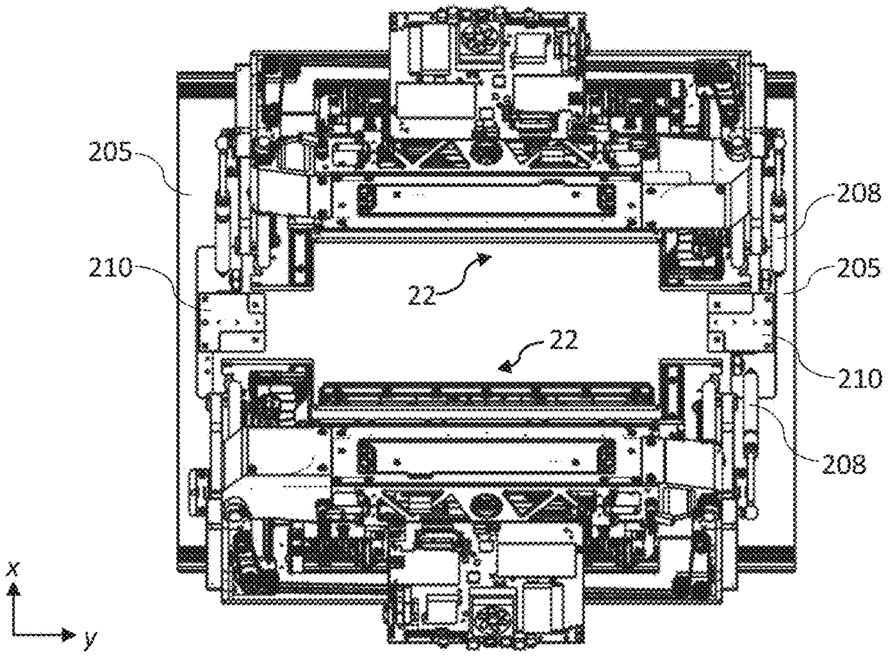
FIG. 5 is a top view of the printing unit in the clamshell-open position.

Referring to FIGS. 3 to 5, the base plates 12 also serve as datum plates for each inkjet module 1 via datuming engagement with chassis datum blocks 210 projecting inwardly from respective chassis side bars 205. Each chassis datum block 210 serves as a common datum for opposed transverse arms 18 of the pair of base plates 12. The chassis datum blocks 210 provide a z-datum for each inkjet module 1, as well as having x- and y-datum features for gross datuming of the inkjet modules along x- and y-axes. Fine adjustment of the relative skew of printheads 3 about a theta z-axis is provided by a printhead nest, as will be explained in further detail below.

Figure 6:
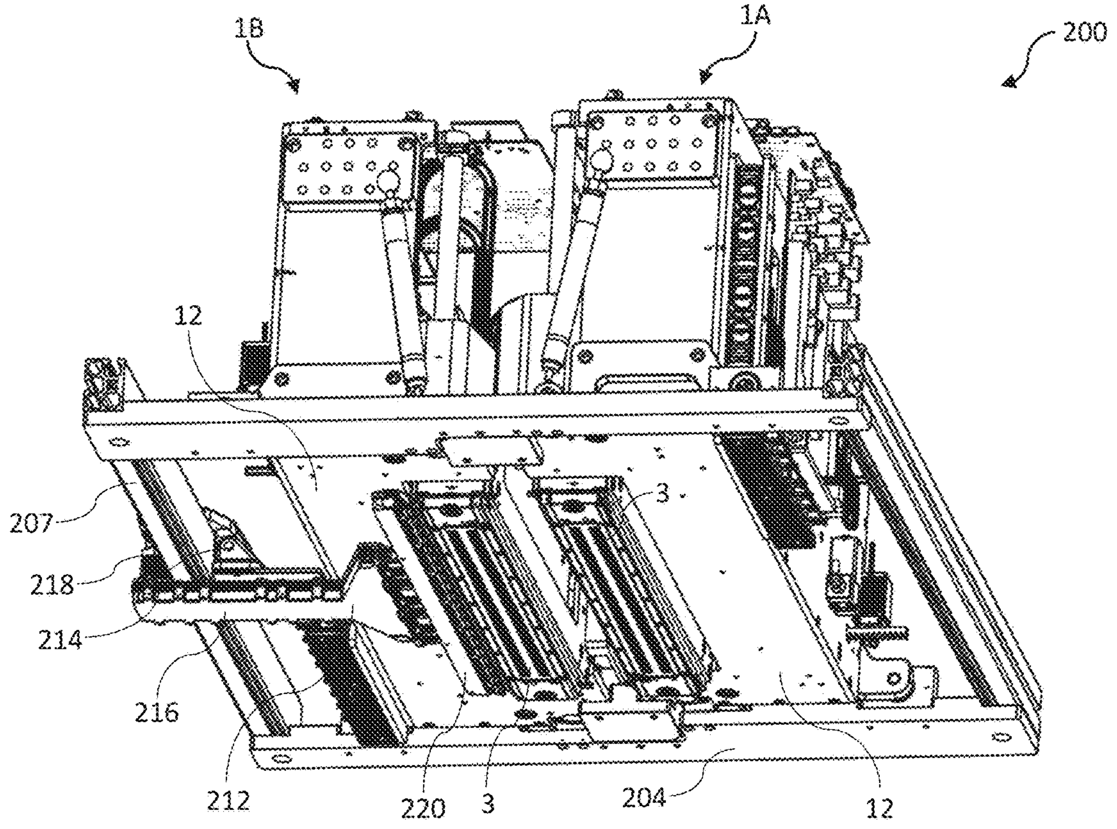
FIG. 6 is a bottom perspective of the printing unit.

In FIG. 6 the printing unit 200 is shown in its printing position with both printheads 3 projecting through respective slots 22 of the base plates 12. An aerosol extractor 212 is mounted to a rear end bar 207 of the unit chassis 204 and extends beneath the base plate 12 of the downstream inkjet module 1B towards the downstream printhead, relative to the media feed direction M. The aerosol extractor 212 is cantilevered by virtue of being pivotally mounted to the rear end bar 207 via a spring-loaded pivot mount 214 and has a free end proximal the downstream printhead 3.

The aerosol extractor 212 comprises a ducting arm 216, which extends from a vacuum port 218 at one end and connected to a suction manifold 220 at an opposite end. The ducting arm 216 and the suction manifold 220 have a generally low height profile with a planar lower surface extending parallel with a plane of the base plates 12. In its quiescent position, the aerosol extractor 212 is biased against the base plate 12 of the downstream inkjet module 1 and extends parallel with a media feed path so as to occupy minimal space between the base plate and, for example, a platen for supporting print media.

The suction manifold 220 is coextensive with the slots 22 and has a plurality of suction nozzles 222 for extracting aerosol from the vicinity of the print zone. The suction nozzles 222 are configured to direct an airflow through the print zone generally along the same direction as the media feed direction M. Therefore, the aerosol extractor 212 not only serves to remove ink mist, but also assists in stabilizing vortices associated with a stream of droplets in the print zone during printing. The base plate 12 of the upstream inkjet module 1A facilitates uniform airflow through the print zone, which is optimal for stabilizing vortices associated with a stream of droplets ejected from the printheads 3. Airflow provided by the aerosol extractor 212 may be further optimized by, for example, an optional interstitial bar having a respective plate positioned between the printheads 3 to provide a more uniform airflow between the printheads and through the print zones (see FIGS. 25 to 27).

Figure 7:
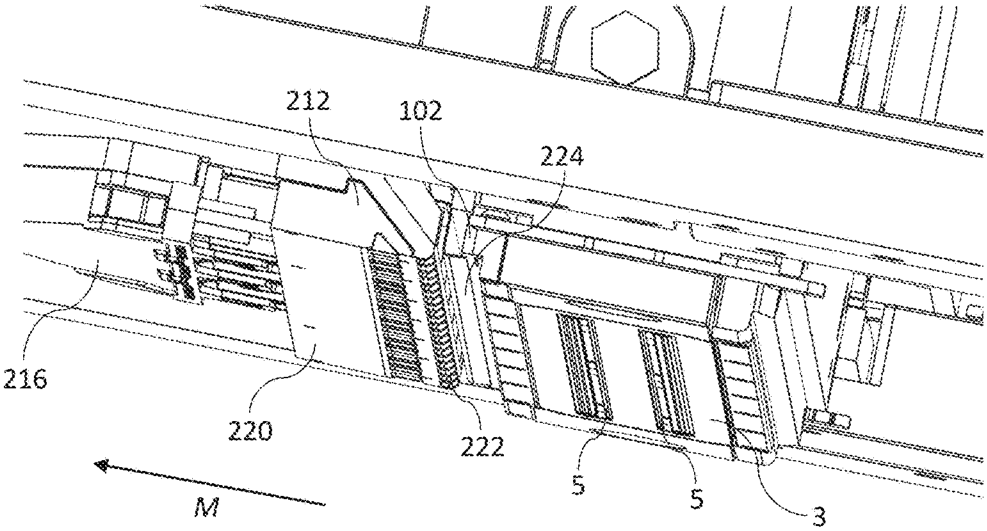
FIG. 7 is a magnified bottom perspective of a suction manifold and printhead.

The printing unit 200 is configurable for printing at different throw distances relative to print media (known in the art as printhead-paper-spacing or PPS) by virtue of adjusting the heights of the printheads 3 using lift mechanisms in each inkjet module 1. Height adjustment of printheads 3 typically disrupts an optimized airflow through the print zone. However, in the printing unit 200, the cantilevered aerosol extractor 212 enables a height of the suction nozzles proximal the downstream printhead to be adjusted. In particular, and referring now to FIG. 7, a leading tab portion 224 connected to the suction manifold 220 is positioned for butting engagement with a printhead nest 102 of supporting the downstream printhead 3. Hence, when the downstream printhead 3 is lowered, butting engagement of the printhead nest 102 with the tab portion 224 pivots the suction manifold 220 against the bias of the pivot mount 218 and thereby lowers the height of the suction nozzles 222 commensurate with the height of the printhead 3. When the printhead 3 is raised, the bias of the pivot mount 218 causes the suction manifold 220 to be raised with the printhead. In this way, the printing unit 200 is suitable for variable PPS printing with optimized aerosol extraction and airflow through the print zone.

Ink Plumbing

In one embodiment, the printheads 3 may be plumbed such that each row of print chips (with individual print chips 6 having multiple aligned nozzle rows for redundant printing) receives only one color of ink. With four rows of print chips 5 across two printheads 3, full color (CMYK) redundant printing may be achieved using all nozzle rows in each print chip. In this way, the printing unit 200 can mimic a conventional inkjet press (e.g., FujiFilm JPress 750S) having monochrome inkjet print bars, albeit with a much narrower print zone (and lower cost) than conventional systems.

Figure 8:
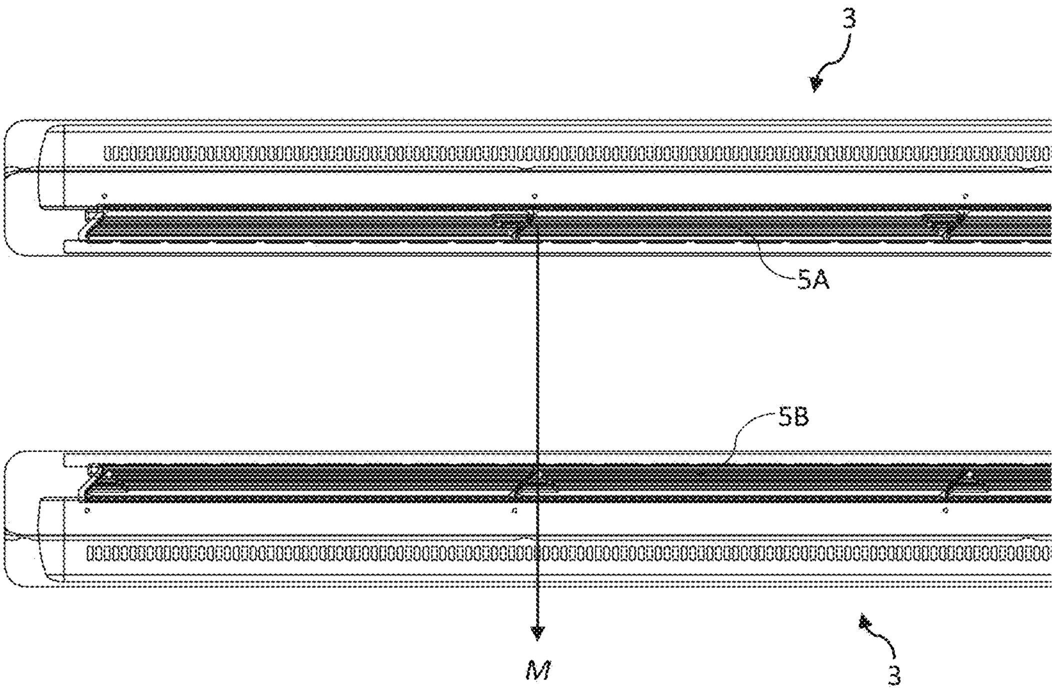
FIG. 8 is a plan view of part of a printhead.
Figure 9:
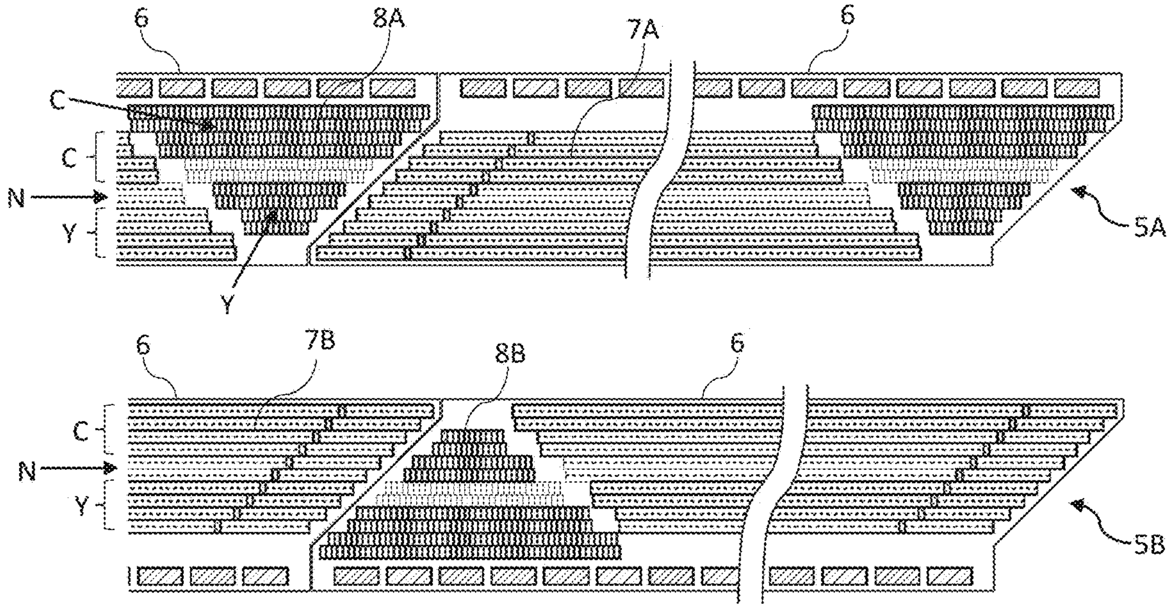
FIG. 9 is a magnified plan view of chip join regions in the printhead.

However, in order to maximize print quality, the printing unit 200 may, in an alternative embodiment shown in FIGS. 8 and 9, make use of the inherent architecture of each printhead 3 having two rows of print chips 5 with 180-degree rotational symmetry. As described in US first and second rows of print chips 5A and 5B in each printhead 3 comprise four color channels whereby each individual print chip 6 within one row may be supplied with two colors of ink. Thus, the two printheads 3 in the printing unit 200 may be considered to have 8 color channels (two color channels per row of print chips 5) for printing four different inks (CMYK).

A fundamental problem, which is ubiquitous in any page wide printing system having multiple print chips, is a loss of print quality at join regions between print chips 6. Inevitably, page wide printheads require some form of compensation in order to print across chip join regions using, for example, an electronic stitching technique, mechanical positioning of chips, a dedicated chip design to enable butting chips, or combinations thereof. In Memjet® printheads 3 having butting chips 6, print quality problems are generally minimized by virtue of the physical proximity of neighboring chips and a proprietary chip architecture having ‘dropped nozzle rows’ (see, for example, U.S. Pat. No. 7,290,852, the contents of which are incorporated herein by reference). Nozzle firing in the dropped nozzle rows is either delayed or advanced relative to main nozzle rows, depending on the orientation of the print chip 6, in order to provide seamless joins between neighboring print chips. Nevertheless, print artefacts may still exist because of the dropped nozzle rows in Memjet® printheads, especially in certain print modes, as described in WO2022/053258.

The printing unit 200 having two color channels available per ink color allows the printheads 3 to be plumbed to mask any print artefacts arising from join regions between neighboring print chips 6. Essentially, each color of ink is allocated to a first color channel of a print chip 6 in the first row 5A in a forward orientation and a second color channel of a print chip 6 of the second row 5B in a reversed orientation (i.e., an orientation rotated 180 degrees relative to the print chip of the first row 5A). In this way, a compensatory set of nozzles 8A in the print chip of the first row 5A (e.g., dropped nozzle rows) are offset from a compensatory set of nozzles 8B in the print chip of the second row 5B. Thus, any print artefacts arising from dropped nozzle rows 8A in the first row of print chips 5A are minimized by corresponding (i.e., aligned) nozzles from a main nozzle region 7B in the second row of print chips 5B. Likewise, any print artefacts arising from dropped nozzle rows 8B in the second row of print chips 5B are minimized by corresponding (i.e., aligned) nozzle from a main nozzle region 7A in the first row of print chips 5A.

In the printhead 3 shown in FIG. 9, the first row of print chips 5A has two cyan (C) nozzle rows (each nozzle row having ‘odd’ and ‘even’ sub-rows) and two yellow (Y) nozzle rows. The middle nozzle row (N) is unused, as described in U.S. Pat. No. 10,293,609, to provide separation between the color channels and minimize ink mixing on the nozzle plate. Likewise, the second row of print chips 5B has two cyan (C) nozzle rows and two yellow (Y) nozzle rows. For each color (e.g., cyan) there are four nozzles aligned along the media feed direction to provide 4× redundancy. However, as shown in FIG. 9, only two cyan dots originate from the dropped nozzle rows 8A of the first row of print chips 5A; the other two cyan dots originate from the main nozzle rows 7B of the second row of print chips 5B. Likewise, aligned yellow (Y) dots originate from the dropped nozzle rows 8A of the first row of print chips 5A and the main nozzle rows 7B of the second row of print chips 5B.

Accordingly, it will be appreciated that the 180-degree rotational symmetry of the first and second rows of print chips 5A and 5B in the same printhead 3 allows print artefacts originating from the dropped nozzle rows 8 to be hidden or at least minimized. This complementary arrangement of first and second rows of print chips 5A and 5B in each printhead 3, combined with a suitable ink plumbing order, advantageously maximizes print quality in the printing unit 200 having two printheads. Each printhead 3 receives two colors of ink, but both inks are supplied to both rows of print chips 5 in a respective printhead.

Inkjet Module

For the sake of completeness, an individual inkjet module 1 used in tandem in the printing system 200 will now be described with reference to FIGS. 10 to 24.

Figure 10:
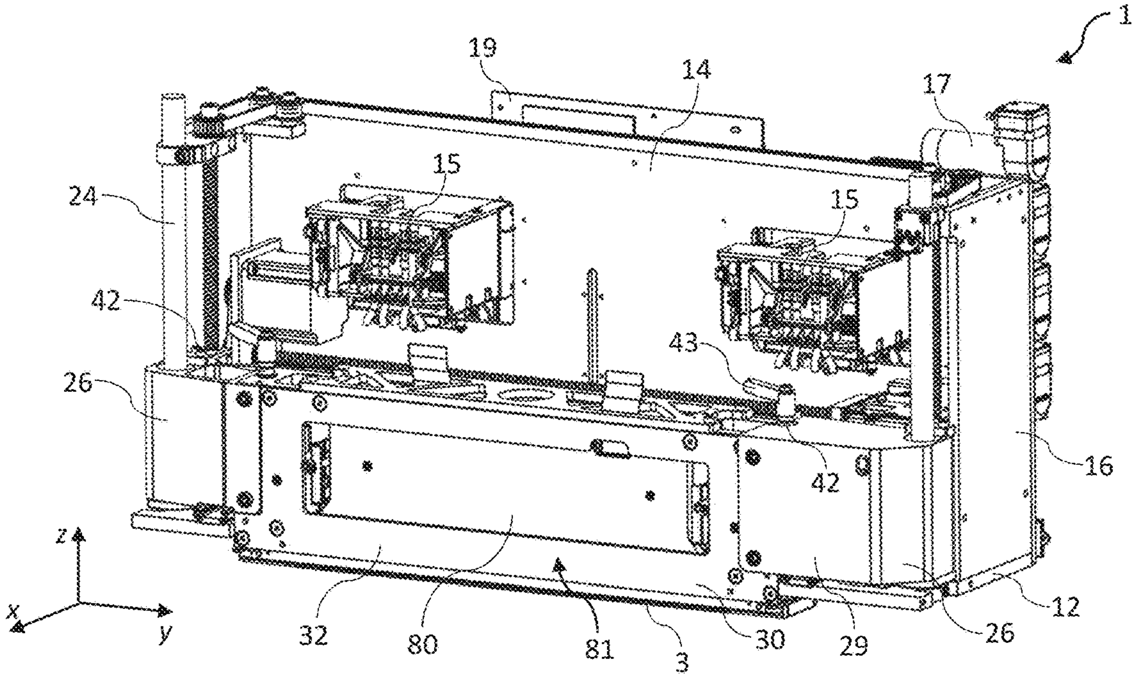
FIG. 10 is a top front perspective of an inkjet module in a printhead lowered position.
Figure 11:
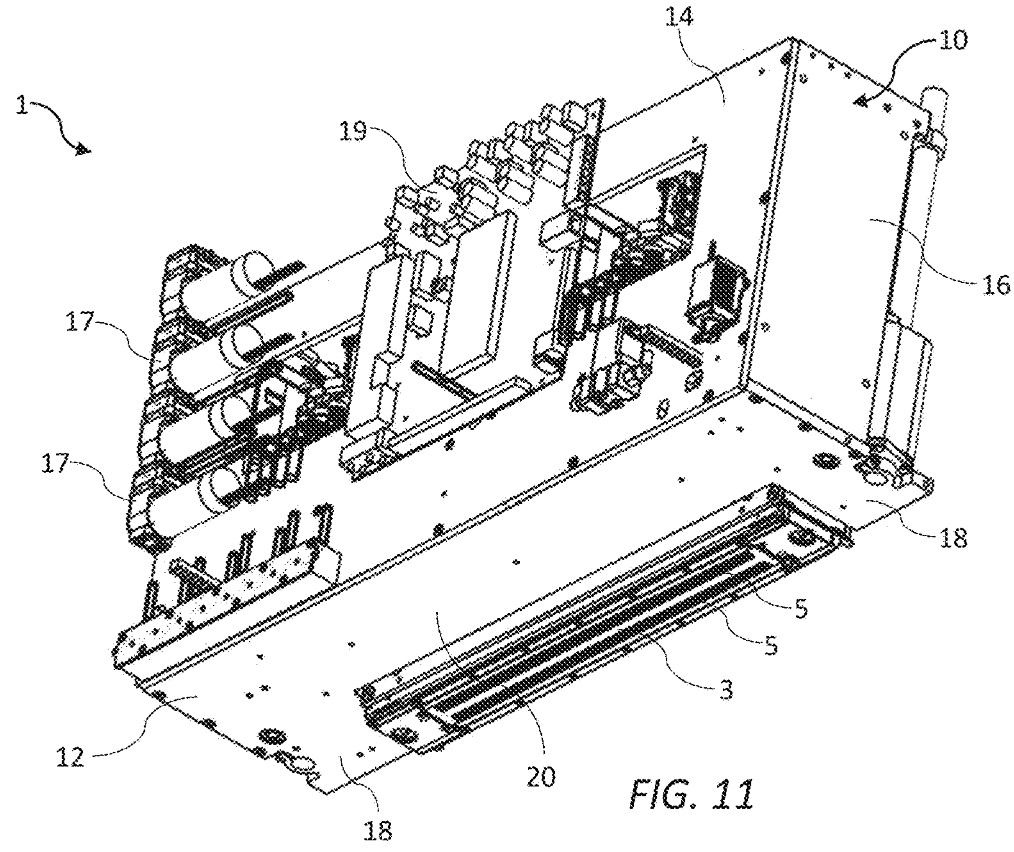
FIG. 11 is a bottom rear perspective of the inkjet module shown in FIG. 1.

As shown in FIG. 10, the inkjet module 1 comprises the chassis 10 having the elongate base plate 12 with the rear wall 14 and a pair of opposite end walls 16 extending upwards from the base plate. Aside from providing the chassis 10 with structural rigidity, the rear wall 14 also serves as a support for mounting various fluidic components (e.g., pinch valves 15 and pumps 17) and electronic components (e.g., module controller PCB 19) on both its front and rear faces. Openings in the rear wall 14 allow fluidic connections from the rear face of the inkjet module 1, without requiring overhead access. Openings may also be provided for the purpose of accessing in situ a screw adjuster of either printhead nest 102 in the printing unit 200 using a suitable tool (not shown), as will be explained in further detail below.

The base plate 12 is generally C-shaped having the pair of transverse arms 18 extending from opposite ends of the longitudinal base member 20 along a nominal x-axis of the inkjet module 1. The open longitudinal slot 22, defined between the transverse arms 18, extends parallel with a longitudinal axis along a nominal y-axis of the inkjet module 1 and is configured for receiving the elongate printhead 3. Thus, the printhead 3 is asymmetrically positioned in the inkjet module 1 towards a front side thereof, so that the printheads are positioned proximally in the printing unit 200. The printhead 3 may be either lowered through the slot 22 for printing or raised above the base plate 12 for maintenance (e.g. capping and/or wiping).

A pair of posts 24 extend upwards from the transverse arms 18 of the base plate 12 at opposite ends of the open longitudinal slot 22. Each post 24 is anchored to the base plate 12 at a lower end thereof and secured to a respective end wall 16 at an upper end thereof. A pair of brackets 26 are slidably engaged with the posts 24 via respective sleeve bushings 28 inserted in each bracket. Each sleeve bushing 28 is slidably movable relative to a respective post 24 allowing vertical linear movement of the brackets 26 towards and away from the base plate 12 along a nominal z-axis of the inkjet module 1. A flanged portion 25 at a lower end of each sleeve bushing 28 is fastened to each bracket 26 and datums its respective bracket against the base plate 12 in the printhead lowered position (FIG. 10).

An elongate printhead carrier 30 is fixedly supported between the brackets 26 and is linearly slidably movable with the brackets. The printhead carrier 30 comprises spaced apart front and rear carrier plates 32 interconnecting the brackets 26 and defining a cavity 34 therebetween for housing electronic components supplying power and data to the printhead 3. A brace 38 interconnects upper parts of the carrier plates 32, while a pair of carrier datum blocks 40 interconnect lower parts of the carrier plates. The carrier datum blocks 40 are positioned at opposite longitudinal ends of the printhead carrier 30 towards respective brackets 26. The braced printhead carrier 30, in combination with the sleeve bushings 28, posts 24 and chassis 10 provide a robust support structure for the printhead 3. The printhead 3 is itself secured within a complementary nest 102 to form a printhead nest assembly 100, which is mounted to the carrier datum blocks 40 via screw fasteners 42 engaged with the nest.

Figure 15:
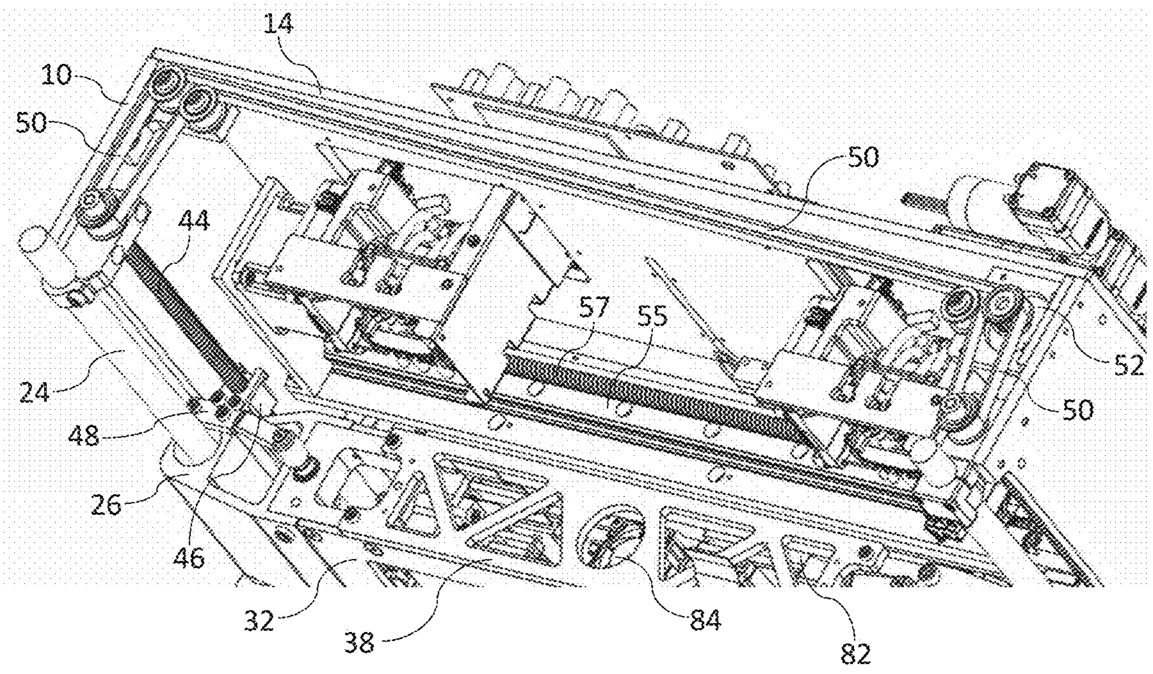
FIG. 15 is a top perspective of the inkjet module showing the lift mechanism.
Figure 16:
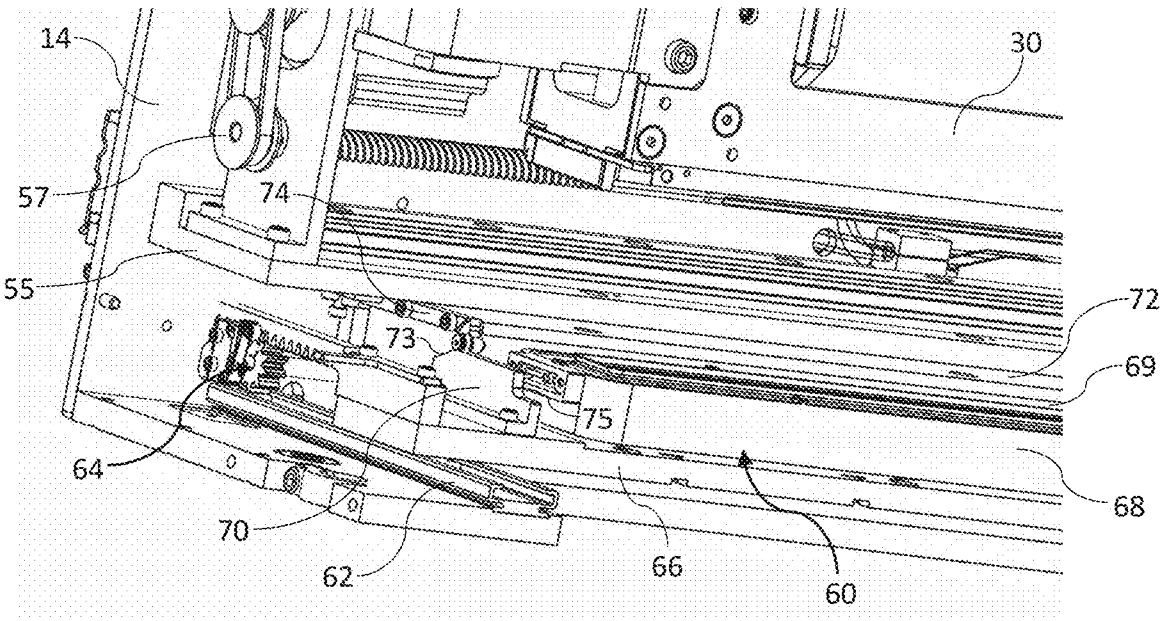
FIG. 16 shows the inkjet module with an end wall removed to reveal a capping assembly and cap cover.

The printhead 3 is linearly slidably movable towards and away from the base plate 12 between a printing position (FIG. 10) and a maintenance position (FIG. 12) by means of a lift mechanism operatively connected to each bracket 26. The lift mechanism also enables the height of the printhead 3 to be adjusted relative to print media in the printing position. As best shown in FIG. 15, the lift mechanism comprises a pair of lead screws 44 rotatably mounted to the base plate 12 and extending upwards parallel with the posts 24. Each lead screw 44 has respective lead nut 46 fixedly connected to a respective bracket via a lead nut connector 48. The lead screws 44 are rotatable by means of an interconnecting pulley belt assembly operatively 50 connected to a common lift motor 52. Accordingly, the printhead 3 may be raised and lowered by actuation of the lift motor 52, which rotates the leads screws 44 simultaneously via the pulley belt assembly 50, thereby raising or lowering the printhead carrier 30 connected to the lead nuts 46 via the brackets 26.

Figure 12:
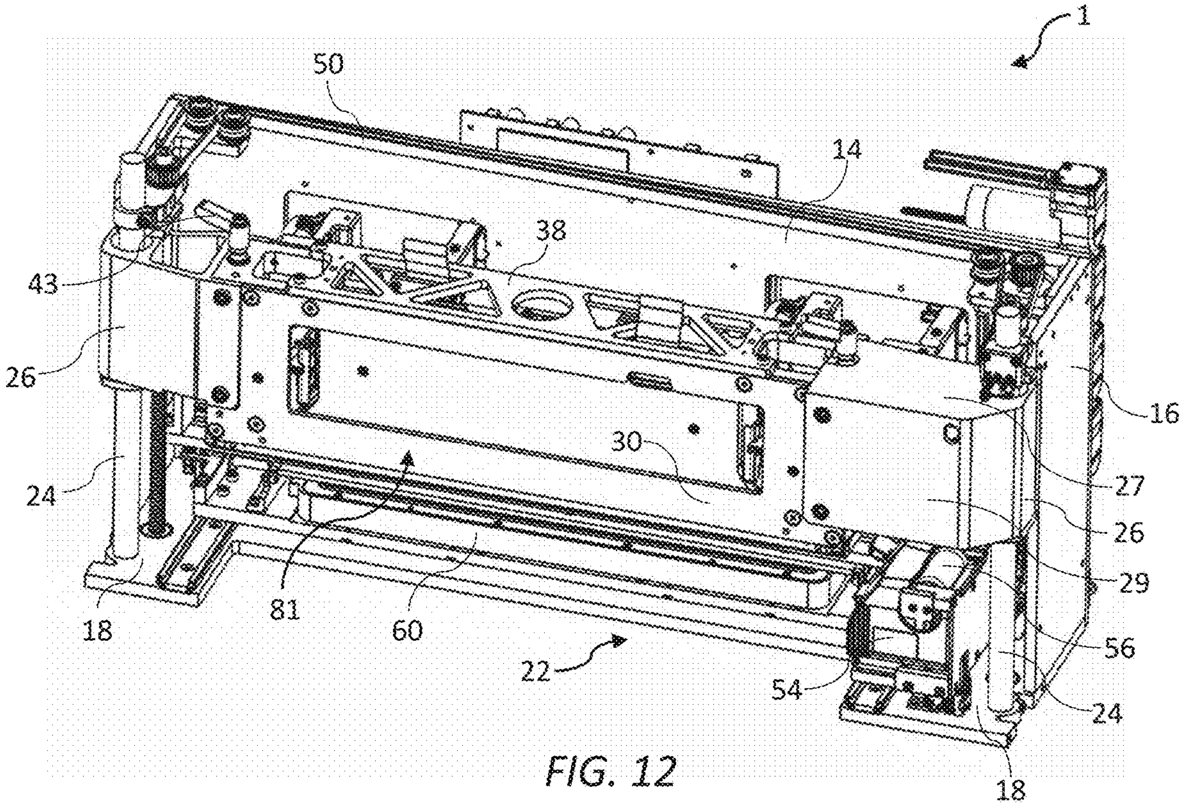
FIG. 12 is a top front perspective the inkjet module is a printhead raised position.

As best shown in FIG. 12, the inkjet module 1 comprises a wiper carriage 54, having a microfiber wiping web 56, parked at one end of the longitudinal slot 22. In the printhead raised position, the wiper carriage 54 is movable longitudinally along the length of printhead 3 by means of a wiper movement mechanism 57 mounted on a longitudinal wiper support 55 to wipe ink and debris from the printhead face. In the printhead lowered position (FIG. 10), one of the brackets 26, having a bracket roof 27 and bracket sidewalls 29, shields the wiper carriage 54. Thus, the bracket roof 27 and bracket sidewalls 29 provide at least some protection from ink mist and/or debris that may contaminate the wiper carriage 54 via an open front face of the inkjet module 1 during printing.

The inkjet module 1 further comprises a capping assembly 60 which is parked towards the rear wall 14 and linearly slidably movable towards and away from the printhead 3 along transverse capper rails 62 by means of rack-and-pinion mechanism 64. The capping assembly comprises 60 a capper base 66 slidably engaged with the capper rails 62, a perimeter printhead capper 68 mounted on the capper base, and cam guides 70 mounted fast with the capper base at opposite ends of the printhead capper. In its parked (covered) position shown in FIG. 12, the printhead capper 68 is covered with a cap cover 72 pivotally mounted to the rear wall 14 of the chassis 10. The cap cover 72 takes the form of a rigid plate, which seals against a perimeter seal 69 of the printhead capper 68 and maintains a humid environment within the printhead capper whenever the printhead capper is not being used for capping the printhead 3. The wiper movement mechanism 57 is mounted on the wiper support 55, which is fixedly attached to the rear wall 14 directly above the cap cover 72.

For printhead capping, the capping assembly 60 is laterally moved away from the cap cover 72 into alignment with the printhead 3, and the printhead is gently lowered onto the printhead capper 68 into a capped position using the lift mechanism. With the printhead raised, transverse movement of the capping assembly 60 back towards the rear wall 14 engages a rear cam surface 73 of the cam guides 70 with an engagement node 77 of respective rocker arms 74 at each end of the cap cover. The rocker arms 74 are pivotally mounted to the rear wall 14 and allow the cap cover 72 to pivot upwards on engagement with the cam guides 70, thereby enabling the capping assembly 60 to slidingly traverse under the cap cover. Once the capping assembly 60 has reached its rearmost parked position, the cap cover 72 pivots back downwards, by virtue of the profile of the cam guides 70 and rocker arms 74, into the covered position in which the printhead capper 68 is covered by the cap cover.

Figure 17A:
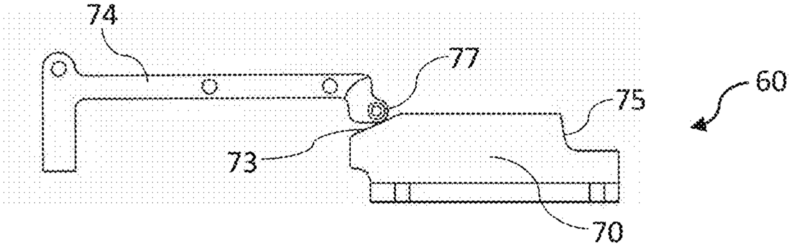
FIGS. 17A-17C are side views of engagement between a cam guide of the capping assembly with a rocker arm of the cap cover.
Figure 17B:
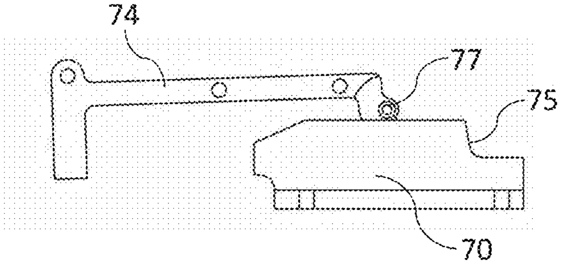
Figure 17C:
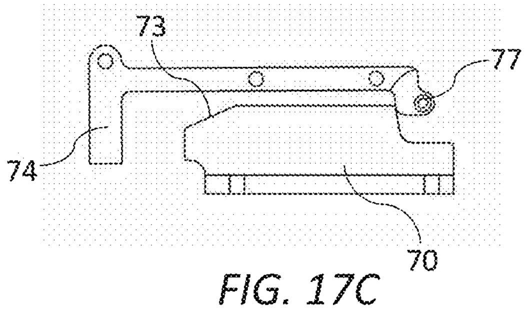

FIG. 17A shows the rear cam surface 73 of the cam guide 70 engaged with an engagement node 77 of the rocker arm 74 as the capping assembly 60 approaches the rear wall 14. FIG. 17B shows the rocker arm 73 pivoted upwards as the capping assembly transitions towards its covered position. FIG. 17C shows the capping assembly 60 in its rearmost parked position with the rocker arm 74 pivoted back into a horizontal plane and the printhead capper 68 covered by the cap cover 72. For printhead capping, the capping assembly 60 slides from its parked position shown in FIG. 17C towards the printhead 3. A front cam surface 75 of the cam guide 70 engages with the engagement node 77 of the rocker arm 74 in order to pivot the rocker arm upwards and allow sliding movement of the capping assembly towards the printhead 3.

Figure 13:
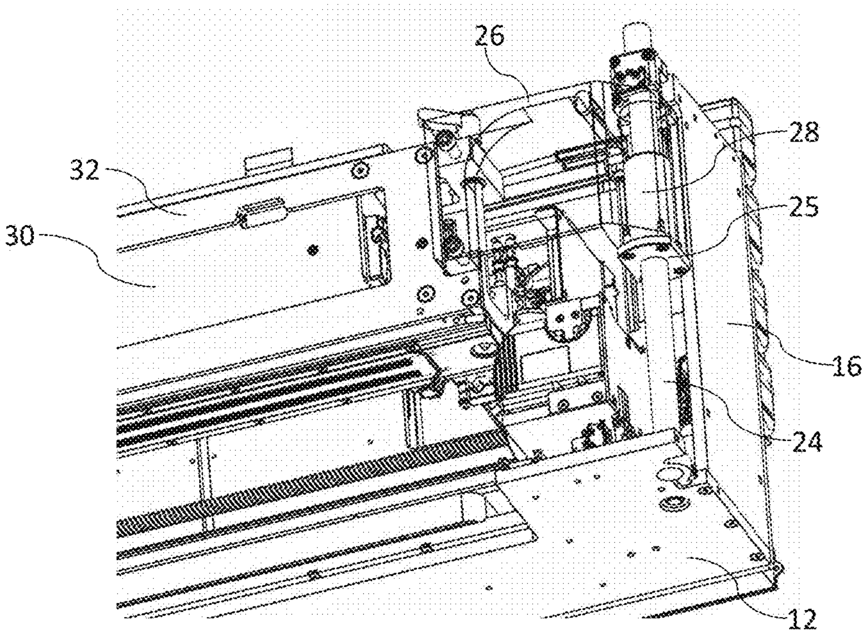
FIG. 13 is a perspective of part of the inkjet module with a bracket shown in transparency to reveal a sleeve bushing.

As foreshadowed above, and referring now to FIGS. 12 and 13, the printhead carrier defines a cavity 34 between front and rear plates 32 thereof. The cavity 34 houses a supply module 80, which includes front and rear PCBs 82 for supplying power and/or data to the printhead 3. A cooling fan 84 is positioned between the PCBs 82 for cooling electronic components with cool air drawn into the cavity 34 from an upper side of the printhead carrier 30. The brace 38, which defines a roof portion of the printhead carrier 30, has an open truss structure, which allows circulation of cool air through the cavity 34 and between the PCBs 82. The supply module 80 further comprises ink couplings 86 for engagement with complementary ink ports 88 at opposite ends of the printhead 3. The supply module 80 forms ink and electrical connections with the printhead 3 upon installation of the printhead (secured in its printhead nest assembly 100) onto the printhead carrier 30, as will be explained in more detail below.

Figure 18:
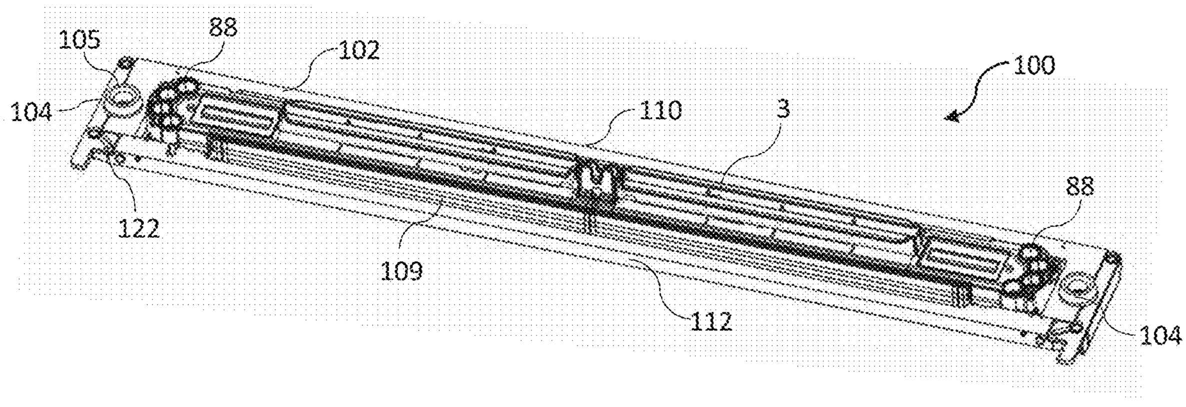
FIG. 18 is top perspective of a printhead nest assembly in a closed position.
Figure 19:
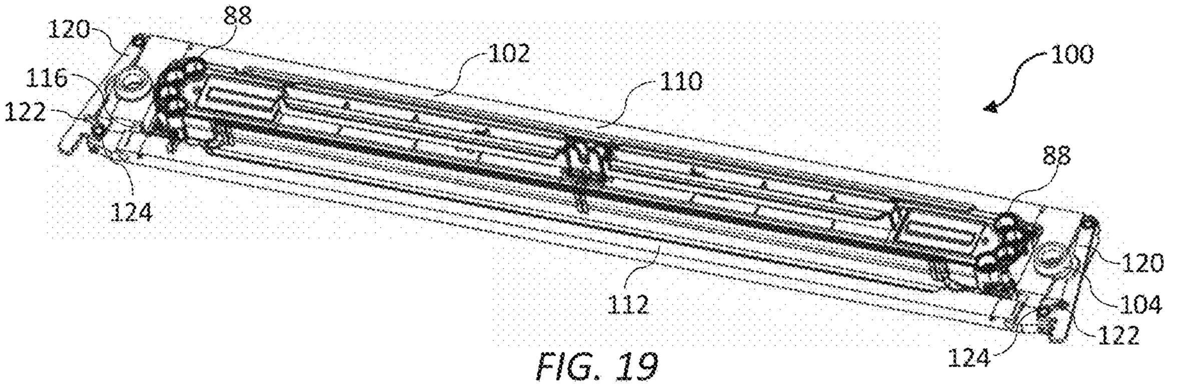
FIG. 19 is a top perspective of the printhead nest assembly in an open position.
Figure 20:
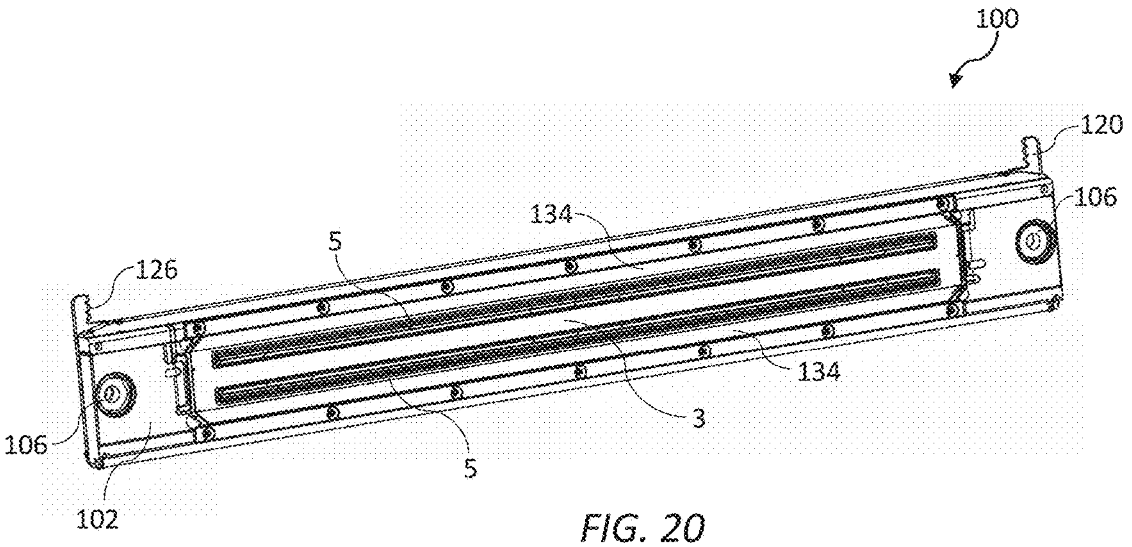
FIG. 20 is a bottom perspective of the printhead nest assembly shown in FIG. 8.
Figure 21:
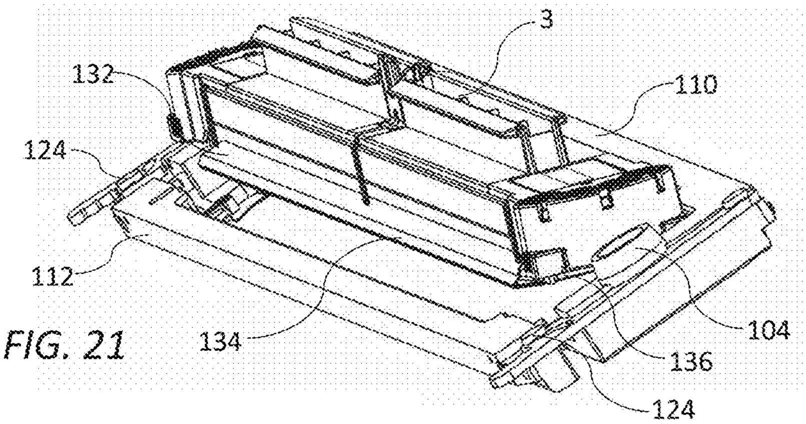
FIG. 21 is a perspective of a printhead being inserted into a nest.

FIGS. 18 and 19 show the printhead nest assembly 100 in isolation. As shown in FIG. 18, the nest is in its closed position with the printhead 3 nestably secured within the nest 102 and enveloped about all sides by the nest. In FIG. 19, the nest 102 is in its open position, which allows removal of the printhead 3 from the nest, but only when the printhead nest assembly 100 is fully detached from the printhead carrier 30. In other words, the printhead 3 must be united with the nest 102 to form the printhead nest assembly 100 before the printhead (e.g. a replacement printhead) can be installed in the inkjet module 1 by fastening the nest 102 to the printhead carrier 30, thereby to form a print module 81 comprising the printhead carrier the supply module 80, the nest 102 and the printhead 3 fast with each other.

Figure 14:
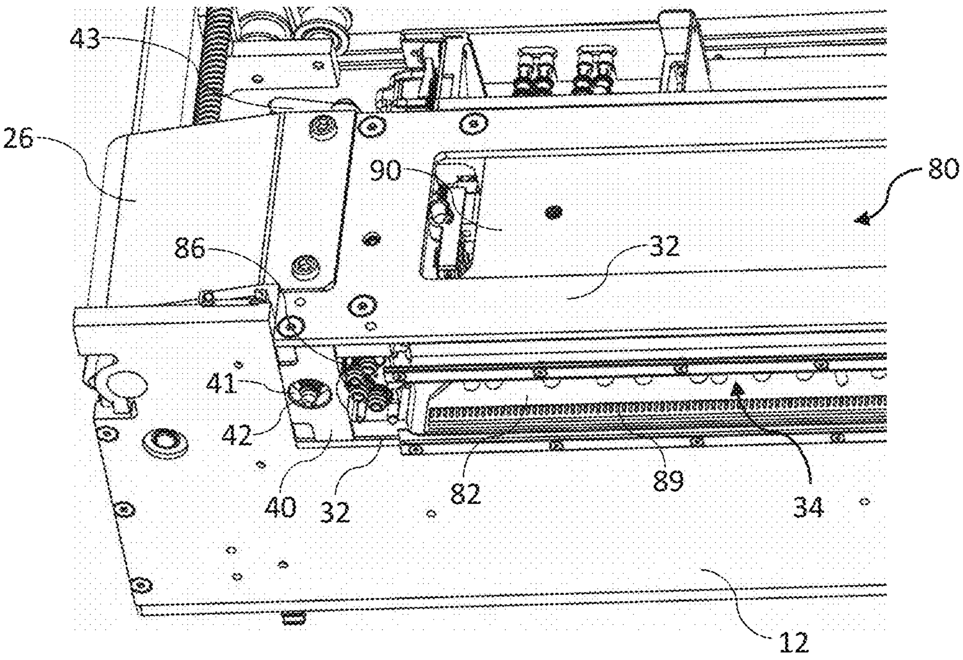
FIG. 14 shows part of a printhead carrier with a printhead nest assembly removed.

The nest 102 is configured for detachable fastening to the printhead carrier 30 via the pair of screw fasteners 42, which extend vertically through a height of the printhead carrier 30. Each screw fastener 42 has a screw lever 43 at one end which is user-accessible from above printhead carrier 30 and a screw tip projecting through a recessed opening 41 in a respective carrier datum block 40 (FIG. 14). An upper surface of the nest 102 has a pair of datum pins 104 configured for complementary engagement with the recessed openings 41 of the carrier datum blocks 40. For installation of the printhead nest assembly 100, each screw fastener 42 is screwed through a hollowed bore 105 of a respective datum pin 104 and into a threaded nut insert 106 of the nest 102. Thus, the printhead nest assembly 100 may be firmly secured to the printhead carrier 30 with accurate datuming controlled by complementary datuming engagement between the datums pins 104 and the recessed openings 41 in each carrier datum block 40. The nest 102 enables the use of relatively large datum pins 104, separate from the printhead 3, for highly accurate and repeatable datuming between the printhead carrier 30 and the printhead nest assembly 100.

Screw fastening of the printhead nest assembly 100 to the printhead carrier 30 via the carrier datum blocks 40 simultaneously forms ink and electrical connections between the printhead 3 and the supply module 80. Ink ports 88 at opposite ends of the printhead 3 are raised into engagement with ink connectors 86 of the supply module 80. Likewise, electrical contacts 109 extending along opposite longitudinal sides of the printhead 3 are brought into electrical contact with complementary PCB contacts 89 of respective PCBs 82 in the supply module 80. Spring-biased PCB mounting plates 90 of the supply module 80 allow the PCBs 82 to flex laterally away from each other while the printhead 3 is raised between the PCBs during installation of the printhead nest assembly 100. The spring bias provides reliable electrical connections, while the requisite insertion force (for both the ink and electrical connections) is provided by the screw fasteners 42, which are readily operable by the user using the screw levers 43. Accordingly, this arrangement obviates the movable supply assembly and two-staged ink and electrical connections, described in U.S. Pat. No. 10,967,638.

The printhead nest assembly 100 may be fastened to the printhead carrier 30 either in the printhead lowered (FIG. 10) or printhead raised position (FIG. 12), depending on whichever configuration is more accessible in a particular modular set-up of the inkjet module 1. As shown in FIG. 14, the printhead nest assembly 100 has been removed in the printhead lowered position.

Figure 22:
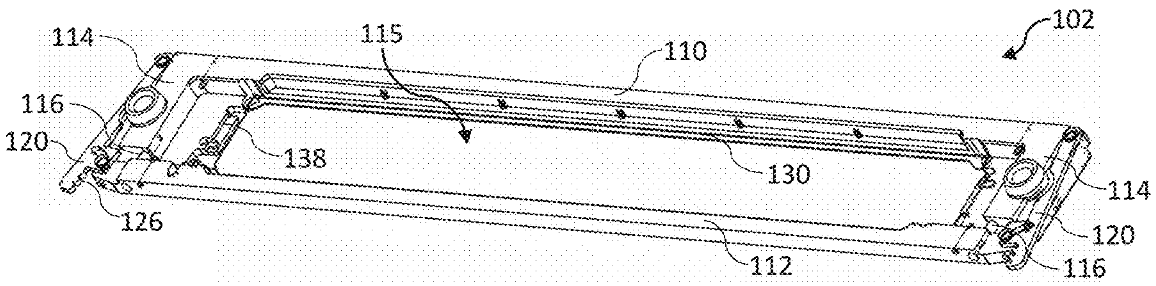
FIG. 22 shows the nest in isolation in an open position.
Figure 23:
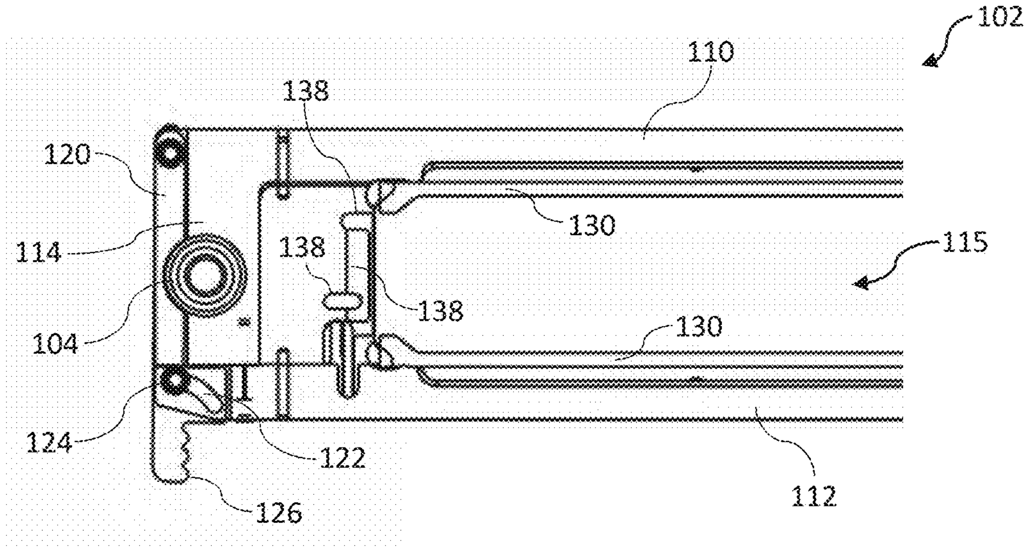
FIG. 23 is a plan view of part of the nest.

Referring now to FIGS. 19 and 22, the nest 102 is configurable in a nest open position for printhead removal and insertion. The nest 102 comprises first and second longitudinal side bars 110 and 112 extending parallel with opposite longitudinal sides of the printhead 3 and a pair of shorter transverse end bars 114 interconnecting each end of the longitudinal side bars to define a rectangular (oblong) nest cavity 115. The first longitudinal side bar 110 and end bars are fixed 114, while the second longitudinal side bar 112 is movable towards and away from the first longitudinal side bar between the open and closed positions.

Each end bar 114 has a dowel pin 116 received the movable second longitudinal side bar 112. Sliding movement of the second longitudinal side bar 112 relative to the fixed dowel pins 116 provides relative linear movement of the second longitudinal side bar towards and away from the first longitudinal side bar 110.

Movement of the second longitudinal side bar is 112 effected by means of a locking mechanism, which configures the nest 102 in either the closed or open positions. The locking mechanism comprises a pair of nest levers 120, each nest lever being pivotally attached to a respective end bar 114 and having a pivot axis perpendicular to a horizontal plane of the nest (i.e. parallel to a direction of droplet ejection from the printhead 3). Each nest lever 120 defines a cam slot 122 engaged with a respective follower pin 124 extending parallel with the pivot axis at opposite ends of the second longitudinal side bar 112. Pivoting motion of each nest lever 120 away from its respective end bar 114 moves the second longitudinal side bar 112 linearly away from the first longitudinal side bar 110, by virtue of the cam engagement between the cam slots 122 and follower pins 124 to open the nest 102. Conversely, pivoting motion of each nest lever 120 towards respective end bars 114 moves the second longitudinal side bar 112 linearly towards the first longitudinal side bar 110 in order to lock the nest 102 closed. Each nest lever 120 has a finger-grip portion 126 at an opposite end from the pivot axis for user actuation of the locking mechanism.

In its closed position, the nest 102 is configured to form an ink mist seal around the printhead 3. The ink mist seal inhibits the ingress of ink mist into the supply module 80 and thereby protects sensitive electronic circuitry on the PCBs 82 from fouling by any ink mist generated during printing. The ink mist seal comprises a pair of opposed first and second longitudinal lips 130 projecting inwardly towards the printhead from respective first and second longitudinal side bars 110 and 112. Each lip 130 is engaged with a longitudinal edge region 132 of the printhead 3 so as to form part of the ink mist seal.

In order to insert the printhead 3 into the nest 102, the nest is firstly configured into its open position as shown in FIG. 22. The printhead is then laterally guided into the open nest cavity 115 at an oblique angle (FIG. 21) towards the first longitudinal side bar 110. A first longitudinal flange 134 at one side of the printhead 3 is initially held at an angle below the longitudinal lip 130 of the first longitudinal side bar 110 so as to overlap with the lip, and then the printhead is rotated about its longitudinal axis into a plane parallel with a plane of the nest. Printhead datums 136 at opposite ends of printhead 3 engage with complementary nest datums 138 (FIG. 23) to provide accurate and repeatable positioning of the printhead within the nest.

With the printhead 3 properly positioned inside the open nest (FIG. 19), the nest levers 120 are pivoted inwards to close the second longitudinal side bar 112 and lock the nest 102 into its closed position, thereby forming the locked printhead nest assembly 100 (FIG. 18). Closure of the nest 102 moves the longitudinal lip 130 of the second longitudinal side bar 112 towards the printhead 3 to complete the ink mist seal with each longitudinal flange 134 of the printhead positioned beneath and overlapping with its respective longitudinal lip.

The complete printhead nest assembly 100 may then be secured to the printhead carrier 30 using the screw fasteners 42 as described above. For printhead removal, the reverse procedure is followed whereby the printhead nest assembly 100 is detached from the printhead carrier 30, the nest opened using the nest levers 120, and the printhead 3 removed obliquely from the open nest 102.

Printhead Skew Adjustment in Printing Unit 200

In the printing unit 200, alignment of upstream and downstream printheads 3 is critical for ensuring optimum print quality. While the above-described datuming arrangements, both within each inkjet module 1 and between the pair of inkjet modules in the printing unit 200, provide robust positioning of the printheads 3, small misalignments between the printheads are, to some extent, inevitable in printing systems comprising multiple printheads, especially when the printheads are replaceable. Non-optimal alignment of the printheads along the x-, y- and z-axes can usually be compensated electronically, if necessary, using information harvested from test patterns during set-up of the system.

However, skew misalignments between the printheads are more difficult to compensate electronically and, therefore, print quality is usually optimized when such skew misalignments are minimized mechanically. Skew misalignment refers to a rotational misalignment of one printhead relative to the other about a z-axis, based on the nominal coordinate system shown in FIGS. 5 and 10. Ideally, of course, both printheads should be parallel.

Figure 24:
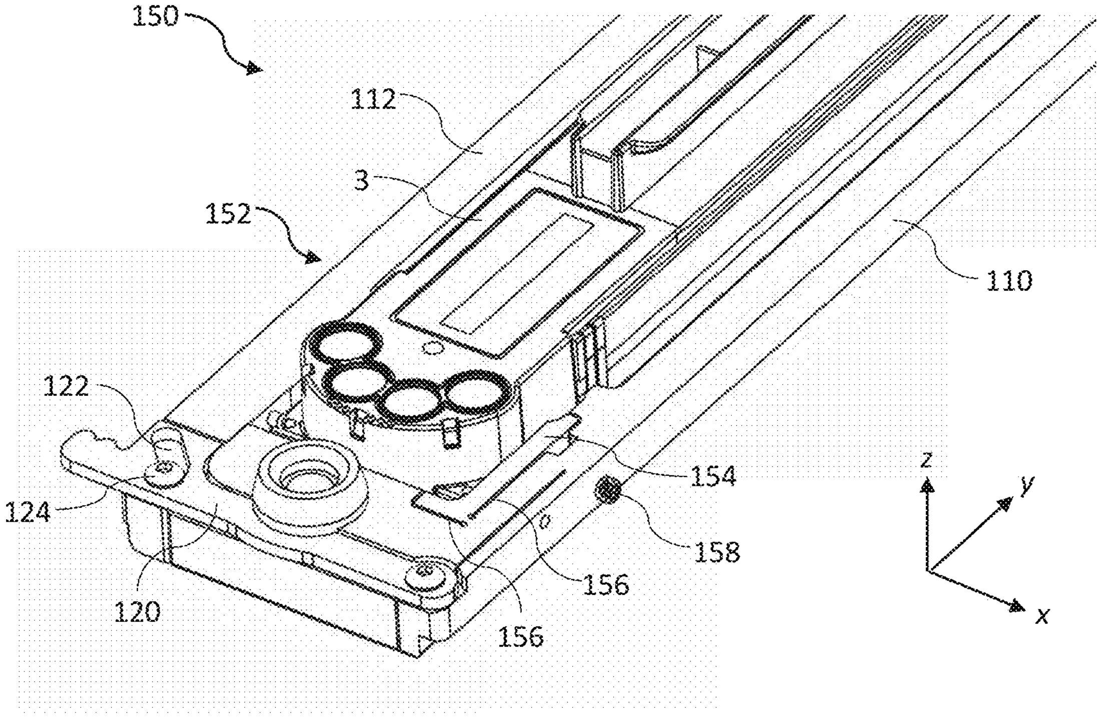
FIG. 24 is a perspective of part of a modified printhead nest assembly.

FIG. 24 shows a modified printhead nest assembly 150 comprising a modified printhead nest 152 and printhead 3, which is adapted for correcting skew misalignments between the pair of printheads in the printing unit 200. In the modified printhead nest 152, a cantilever spring 154 is formed at one end of the printhead nest by means of micromachined slots 156 defined in the first (fixed) longitudinal side bar 110. A screw adjuster 158, received through a screw opening in the first longitudinal side bar 110, is in butting engagement with the cantilever spring 154 for urging the cantilever spring towards and away from the printhead 3. Since the printhead 3 is datumed against the cantilever spring 154, the screw adjuster 158, when screwed along the x-axis, can impart a slight rotational movement to one end of the printhead 3 via movement of the cantilever spring 154. Accordingly, fine skew adjustments to the printhead 3 can be made in situ using the screw adjuster 158.

Typically, in the printing unit 200, the printhead 3 of one inkjet module is taken to be a reference printhead, and the skew of the other printhead is adjusted relative to the reference printhead. Hence, only one of the printhead nests is required to have the cantilever spring 154 and screw adjuster 158, although in practice it is convenient for both printhead nests to be identical.

As foreshadowed above, the screw adjuster 158 is preferably accessible when the printing module 200 is being set-up for use. Therefore, the rear wall 14 of each module chassis 10 typically has a suitable window enabling external access to the screw adjuster 158 (either in the printhead raised or printhead lowered position) when the printing unit 200 is in its clamshell-closed position, shown in FIG. 1.

Optimized Airflow Through Print Zones

Optimizing airflow through print zones during high-speed printing is known to improve print quality, especially for high PPS printing—that is a printhead-paper-spacing (PPS) of greater than about 1 mm (e.g., 1 to 10 mm or 1 to 5 mm). For example, U.S. Pat. No. 6,997,538 (assigned to Hewlett-Packard Development Company, L.P.) describes an inkjet printer having means for generating an airflow through the print zone in a direction of media travel. The airflow is generated using an upstream blower, downstream suction or a combination thereof. Subsequent studies by the present Applicant have confirmed the importance of controlling airflow through print zone(s) as a means for optimizing print quality. A uniform airflow creates a pressure gradient across the print zone, which tends to stabilize vortices associated with the stream of ejected ink droplets. Those vortices are generated by interaction between the stream of ink droplets and a Couette flow induced by the moving print media. In the absence of a forced airflow through the print zone producing a pressure gradient, the vortices tend to drift, resulting in unique print artefacts, known as "tiger-striping" or "woodgraining" effects.

Figure 25:
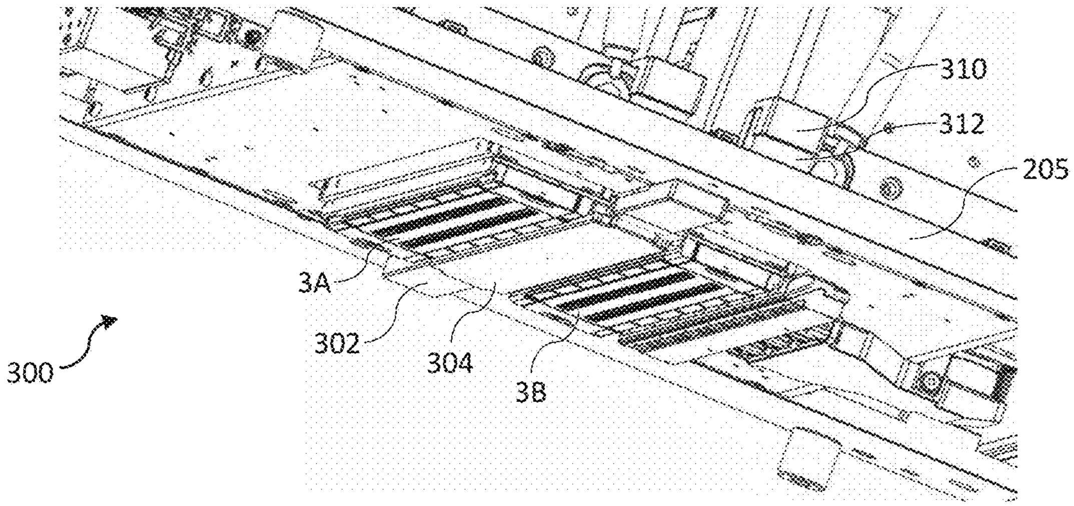
FIG. 25 is a bottom perspective of a modified printing unit having an interstitial bar.
Figure 26:
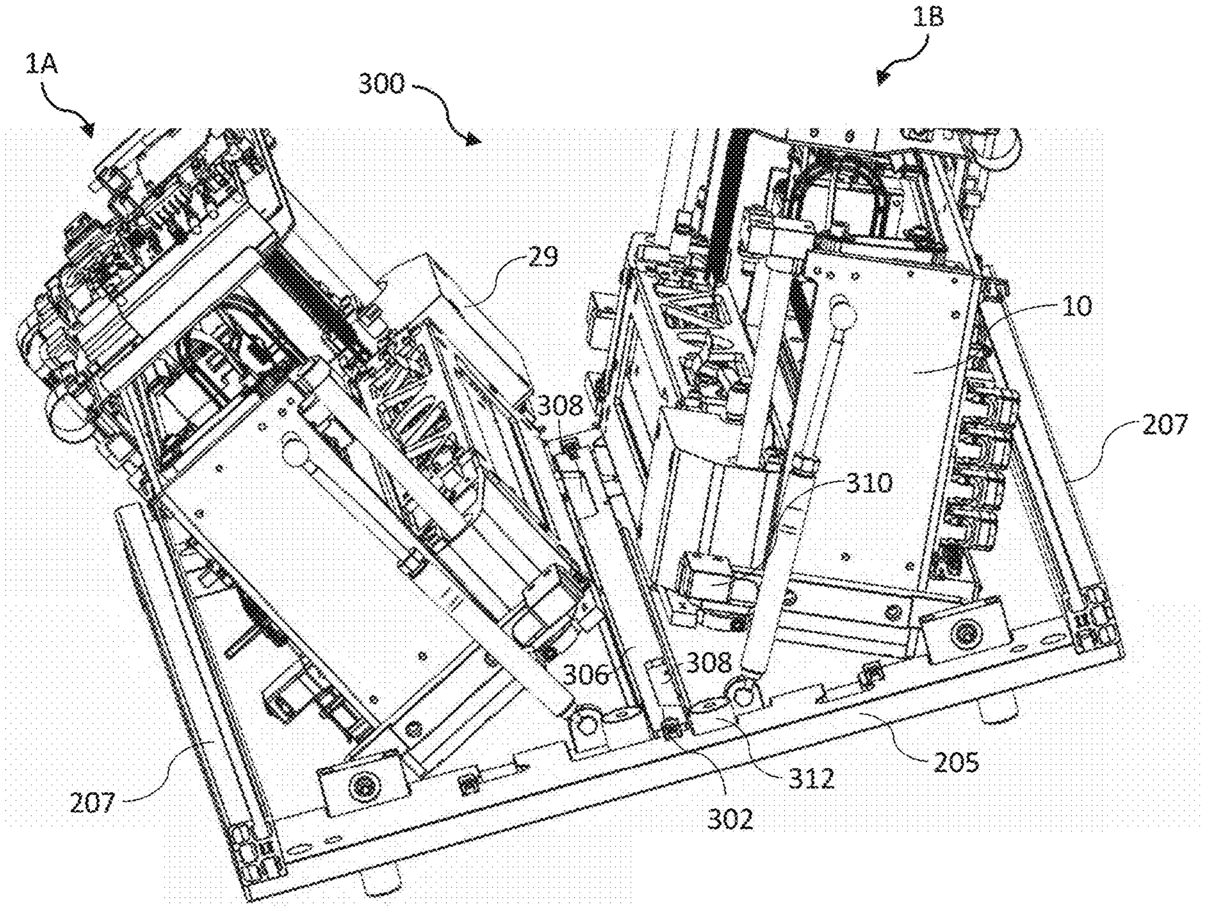
FIG. 26 is a top perspective of the modified printing in a clamshell-open configuration.
Figure 27:
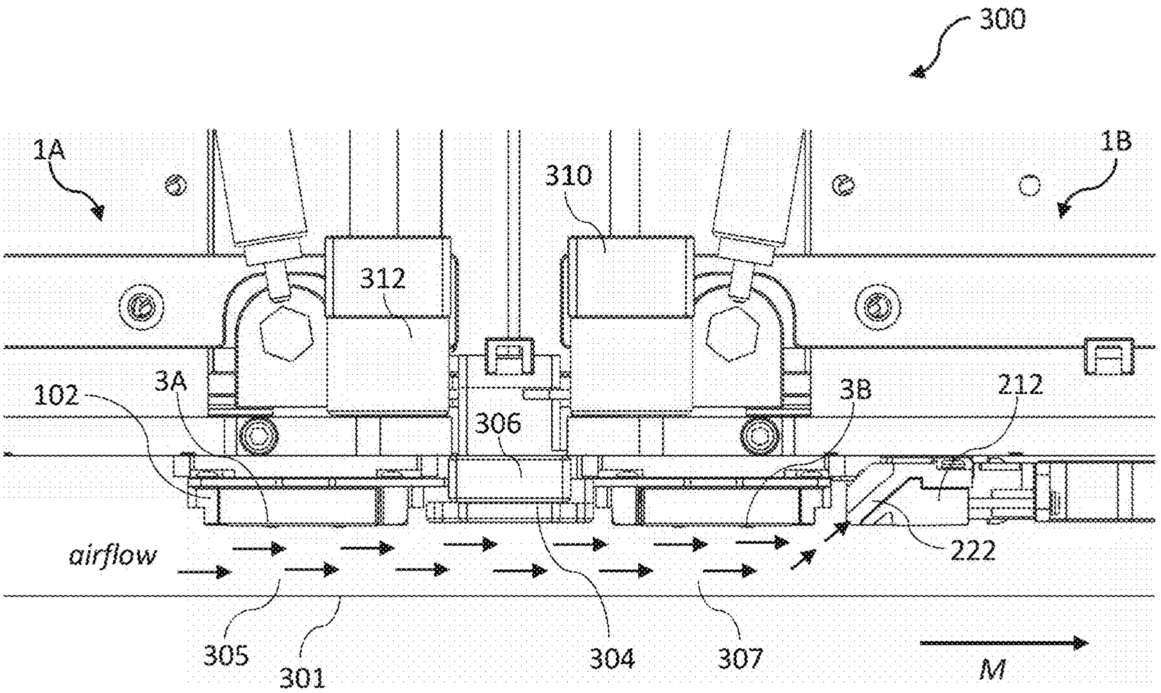
FIG. 27 is a side view showing print zones of the modified printing unit.

Referring to FIGS. 25 to 27, there is shown a modified printing system 300, which is similar to the printing system 200 described above in connection with FIGS. 1 to 6 but having an interstitial bar 302 positioned in a space between respective upstream and downstream printheads 3A and 3B of the upstream and downstream inkjet modules 1A and 1B. Where relevant, like reference numerals are used to indicate like features in the printing system 200 and the modified printing system 300.

The interstitial bar 302 extends between opposite side bars 205 of the unit chassis 204—that is, parallel with the end bars 207 and the longitudinal axes of the upstream and downstream printheads 3A and 3B. The interstitial bar 302 comprises a polymer plate 304 attached to an underside of a metal support bar 306, the polymer plate defining a planar lower surface positioned at substantially a same height as a lower surface of the printheads 3A and 3B relative to print media 301. In some embodiments, the interstitial bar 302 and/or the polymer plate 304 may be height-adjustable to match the relative heights of the polymer plate and the printheads 3A and 3B.

The polymer plate 304 has a width dimension that extends substantially entirely across a space between the upstream and downstream printheads 3A and 3B (e.g. at least 70%, at least 80% or at least 90% across the inter-printhead space) and a length dimension at least coextensive with the printheads. By filling the inter-printhead space in this way, a relatively uniform airflow is provided from an upstream print zone 305, through a downstream print zone 307 and towards suction nozzles 222 of the aerosol extractor 212 (FIG. 27). This optimized airflow advantageously stabilizes vortices associated with the stream of ejected ink droplets ejected from the printheads 3A and 3B, thereby minimizing misplacement of stray satellite droplets and optimizing print quality. In the absence of the interstitial bar 302, airflow is less uniform and the suction nozzles 222 have minimal effect on the upstream print zone 305, instead drawing air primarily from the inter-printhead space and surrounds.

Additionally, the polymer plate 304 advantageously minimizes condensation of ink mist onto the interstitial bar 302. Condensate on, for example, metal surfaces can undesirably drip onto print media and foul print images.

As best shown in FIG. 26, an upper surface of the support bar 306 has a pair of recessed portions 308 configured for receiving complementary parts of the upstream and downstream inkjet modules 1A and 1B. Specifically, the bracket sidewalls 29 of each inkjet module are received in respective recessed portions 308 when the printing unit 300 is in its clamshell-closed position.

It will be appreciated that the interstitial bar 302 may be useful for datuming each inkjet module against the unit chassis 204. However, in the embodiment shown in FIGS. 25 to 27, datuming of each inkjet module 1 is achieved via respective magnet datums 310, fast with each module chassis 10, engaging with complementary chassis datum blocks in the form of electromagnets 312. Thus, secure datuming of each inkjet module 1 against the unit chassis 204 is achieved via magnetic attraction, as described in U.S. Pat. No. 11,376,869, the contents of which are incorporated herein by reference. Release of the inkjet modules 1 from respective printing positions may be controlled by the electromagnets 312.

Figure 28:
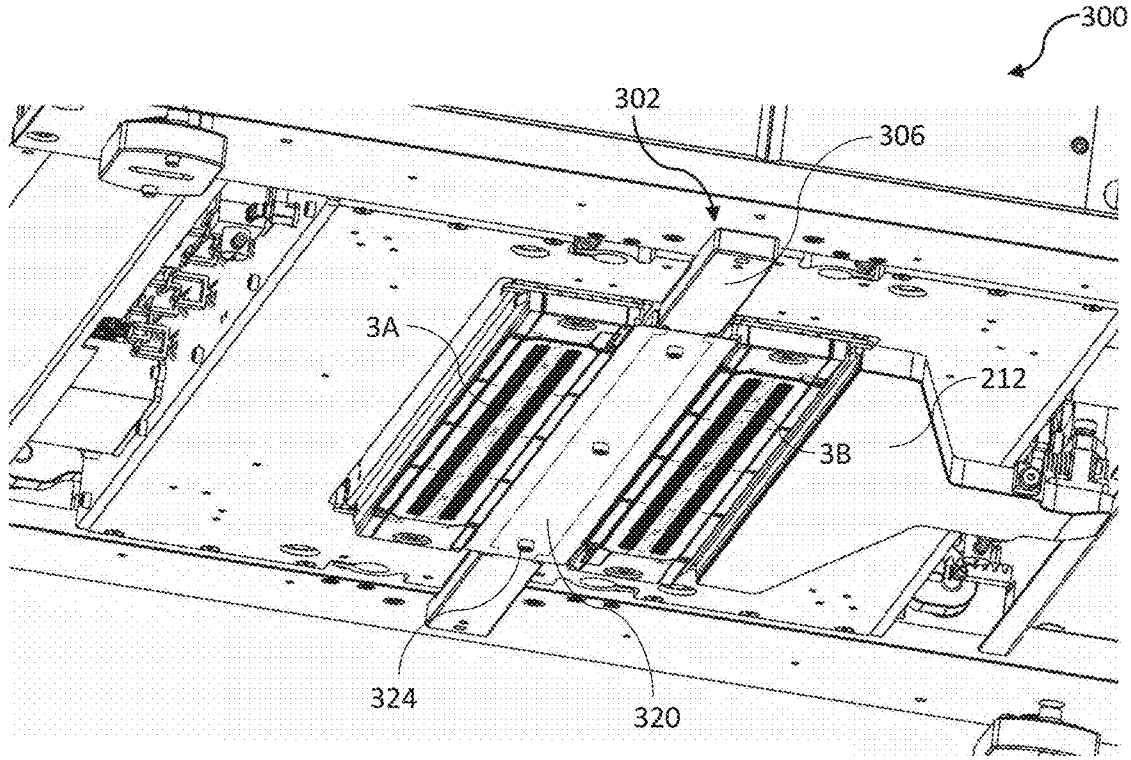
FIG. 28 is a bottom perspective of a modified printing unit having an alternative interstitial bar with a polymer film.
Figure 29:
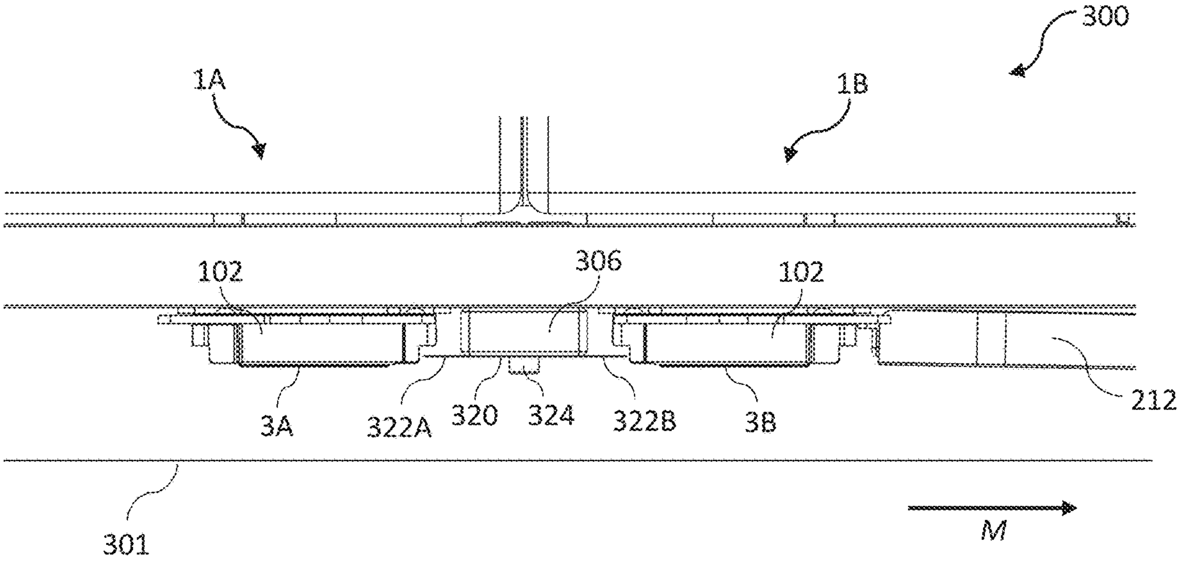
FIG. 29 is a side view of the modified printing unit shown in FIG. 28.
Figure 30:
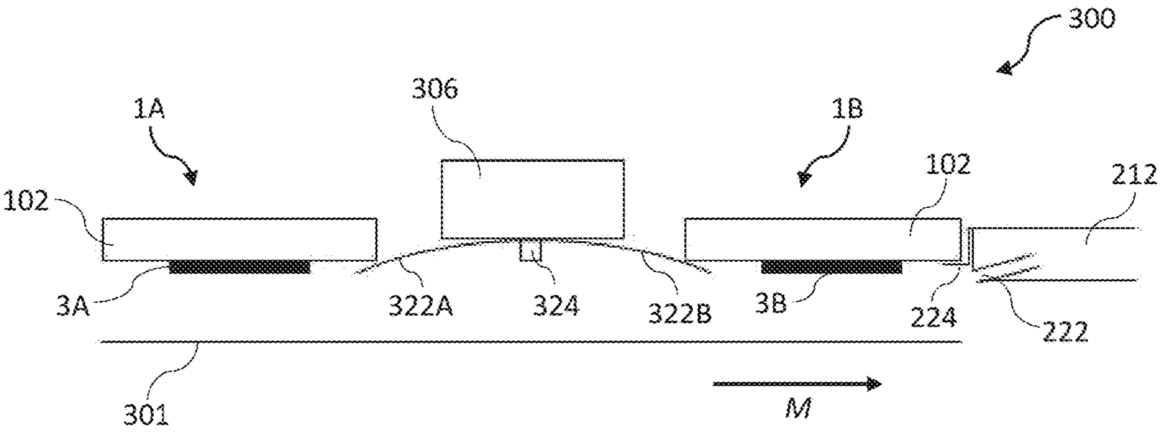
FIG. 30 is a schematic side view of the modified printing unit shown in FIG. 28 in a printing position.

Referring to FIGS. 28 to 30, there is shown a variant of the interstitial bar 302 in which a resiliently deformable polymer film 320 is attached to a lower surface of the support bar 306 in place of the polymer plate 304. The film 320 has a first wing 322A and a second wing 322B extending upstream and downstream, respectively, from longitudinal edges of the support bar 306 relative to the media feed direction. As shown in FIGS. 28 and 29, in its non-deformed configuration, the film 320 is generally planar having its plane extending parallel with the print media 301. However, downward movement of the print modules (having respective nests 102) towards the print media 301 causes the upstream and downstream wings 322A and 322B of the film 320 to bend downwards towards the print media by virtue of engagement with respective nests of the upstream and downstream inkjet modules 1A and 1B (FIG. 30). Accordingly, each of the upstream and downstream wings 322A and 322B functions as a resilient flap, which is able to bend towards the print media 301 via engagement with a respective nest 102.

Since the film 320 is attached along a longitudinal mid-portion of the support bar 306 via retainer pins 324, the film 30 adopts a concave profile between the upstream and downstream printheads 3A and 3B in the printing position shown in FIG. 30. Engagement between the nests 102 and respective wings 322A and 332B forms a partial seal therebetween which is sufficient to minimize airflow through the space between the upstream and downstream printheads 3A and 3B. Thus, the film 320 provides a more effective seal across the space between the upstream and downstream printheads 3A and 3B than the arrangement shown in FIGS. 25 to 27, because the polymer plate 304 can only partially extend across this space depending on the height(s) of the printheads relative to the print media 301. The film 320 can accommodate a range of different printhead heights, whilst still maintaining an effective seal and optimizing airflow through the print zones.

From the foregoing and FIG. 30, it will be further appreciated that the nest 102 corresponding to the downstream printhead 3B engages with both the downstream wing 322B as well as the tab portion 224 (see FIG. 7) of the aerosol extractor 212 simultaneously. This dual function of the nest 102 is particularly advantageous for optimizing airflow through the print zone(s) by controlling both the height of the suction nozzles 222 commensurate with the height of the printhead 3B, as well as the configuration of the film 320.

It will, of course, be appreciated that the present invention has been described by way of example only and that modifications of detail may be made within the scope of the invention, which is defined in the accompanying claims.

The invention claimed is:

1. A printing unit comprising:

a unit chassis; and first and second opposed inkjet modules mounted in tandem on the unit chassis in forward and reverse orientations, each inkjet module having one respective printhead, wherein:

each printhead comprises first and second rows of print chips mounted on a unitary surface of a respective ink manifold, the first and second rows of print chips comprising a plurality of print chips butted end-on-end along a length of the printhead;

the printheads are wholly aligned with respect to a media feed direction for printing in four ink colors from the pair of printheads;

the second inkjet module in the reverse orientation is rotated by 180 degrees relative to the first inkjet module in the forward orientation; and the first row of print chips in one printhead redundantly prints two colors of ink via a plurality of aligned nozzle rows for each color and the second row of print chips in said printhead redundantly prints the same two colors via a plurality of aligned nozzle rows for each color.

2. The printing unit of claim 1, wherein the first and second rows of print chips on each one of the printheads have 180-degree rotational symmetry.

3. The printing unit of claim 2, wherein compensatory sets of nozzles adjacent join regions in the first row of print chips are offset, with respect to the media feed direction, from compensatory sets of nozzles adjacent join regions in the second row of print chips.

4. The printing unit of claim 1, wherein each compensatory set of nozzles comprises dropped nozzle rows offset from main nozzle rows in each print chip, the print chip being configured to either delay or advance firing of the dropped nozzle rows relative to the main nozzle rows.

5. The printing unit of claim 1, wherein each printhead is asymmetrically disposed towards a front side of its respective inkjet module, and wherein the first and second opposed inkjet modules in said forward and reverse orientations position the pair of printheads in a relatively proximal arrangement and position a pair of cappers in a relatively distal arrangement.

6. The printing unit of claim 5, wherein a span of a print zone along the media feed direction is less than 20 cm.

7. The printing unit of claim 6, wherein each row of print chips has at least fourfold redundancy, whereby aligned nozzles of at least four nozzle rows are capable of printing onto a same pixel position.

8. The printing unit of claim 1, wherein the first and the second inkjet modules are pivotally mounted on the unit chassis for pivotally moving the inkjet modules towards and away from each other.

9. The printing unit of claim 8, wherein, in a clamshell-closed configuration, the printing unit is configured for printing and, in a clamshell-open configuration, a respective front face of each inkjet module is accessible for printhead replacement.

10. The printing unit of claim 9, wherein each inkjet module is independently pivotable relative to the unit chassis.

11. The printing unit of claim 1, wherein each inkjet module comprises a module chassis having a base plate with rear and end walls extending upwards therefrom.

12. The printing unit of claim 11, wherein each base plate is C-shaped in plan view having a pair of transverse arms extending parallel to the media feed direction from opposite ends of a longitudinal base member extending perpendicular to the media feed direction, each base plate defining an open longitudinal slot for receiving a respective printhead.

13. The printing unit of claim 12, wherein the first and second opposed inkjet modules in said forward and reverse orientations have opposed C-shaped base plates, such that the pair of open longitudinal slots are proximally positioned relative to the pair of longitudinal base members.

* * * * *